(12) United States Patent
Feng et al.

(10) Patent No.: US 6,270,903 B1
(45) Date of Patent: Aug. 7, 2001

(54) METHOD OF BONDING FUNCTIONAL SURFACE MATERIALS TO SUBSTRATES AND APPLICATIONS IN MICROTECHNOLOGY AND ANTI-FOULING

(75) Inventors: Xiangdong Feng; Jun Liu, both of West Richland; Liang Liang, Richland, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/410,173

(22) Filed: Sep. 30, 1999

Related U.S. Application Data

(62) Division of application No. 09/036,363, filed on Mar. 6, 1998, now Pat. No. 5,997,961.

(51) Int. Cl.[7] .................................................. B32B 17/06
(52) U.S. Cl. ........................................... 428/429; 428/442
(58) Field of Search ..................... 428/428, 429, 428/442, 336; 427/407.2, 508, 515

(56) References Cited

U.S. PATENT DOCUMENTS 5,843,767 * 12/1998 Beattie ............................. 435/287.1

* cited by examiner

Primary Examiner—D. S. Nakarani
(74) Attorney, Agent, or Firm—Stephen R. May

(57) ABSTRACT

A simple and effective method to bond a thin coating of poly(N-isopropylacylamide) (NIPAAm) on a glass surface by UV photopolymerization, and the use of such a coated surface in nano and micro technology applications. A silane coupling agent with a dithiocarbamate group is provided as a photosensitizer preferably, (N,N'-diethylamine) dithiocarbamoylpropyl-(trimethoxy) silane (DATMS). The thiocarbamate group of the sensitizer is then bonded to the glass surface by coupling the silane agent with the hydroxyl groups on the glass surface. The modified surface is then exposed to a solution of NIPAAm and a crosslinking agent which may be any organic molecule having an acrylamide group and at least two double bonds in its structure, such as N, N'-methylenebisacrylamide, and a polar solvent which may be any polar liquid which will dissolve the monomer and the crosslinking agent such as acetone, water, ethanol, or combinations thereof. By exposing the glass surface to a UV light, free radicals are generated in the thiocarbamate group which then bonds to the crosslinking agent and the NIPAAm. Upon bonding, the crosslinking agent and the NIPAAm polymerize to form a thin coating of PNIPAAm bonded to the glass. Depending upon the particular configuration of the glass, the properties of the PNIPAAm allow applications in micro and nano technology.

15 Claims, 14 Drawing Sheets

(a)

(b)     (c)

◆ Composition of gel, NIPAAm/BisAAm = 10 (molar ratio)
■ Composition of gel, NIPAAm/BisAAm = 45 (molar ratio)

Shrinking temperature from 15 C ◆ 25 C ■ 32 C ▲ 42 C
Composition of gel: NIPAAm/BisAAm = 10 (molar ratio)

Shrinking temperature from 15 C to ◆ 25 C ■ 32 C ▲ 42 C
Composition of gel: NIPAAm/BisAAm = 45 (molar ratio)

- ◆ Surface of composite gel: NIPAAm/BisAAm = 45 (molar ratio)
- ■ Surface of composite gel: NIPAAm/BisAAm = 10 (molar ratio)
- ● Surface with OH groups
- ▲ Surface with VDCS groups

- ■ Surface with OH groups
- ▲ Surface with SiCH=CH2 groups
- ● Surface with PNIPAAm gel, NIPAAm/BisAAm (molar ratio)=45

□ Advancing contact angle
■ cos (advancing contact angle)

METHOD OF BONDING FUNCTIONAL SURFACE MATERIALS TO SUBSTRATES AND APPLICATIONS IN MICROTECHNOLOGY AND ANTI-FOULING

CROSS REFERENCE TO RELATED APPLICATION

This patent application is a divisional application of Ser. No. 09/036,363, filed Mar. 06, 1998, now U.S. Pat. No. 5,997,961.

This invention was made with Government support under Contract DE-AC06-76RLO 830 awarded by the U.S. Department of Energy. The Government has certain rights in the invention.

FIELD OF THE INVENTION

The present invention relates generally to a methods of bonding functional surface materials such as poly(N-isopropylacrylamide) (PNIPAAm) to substrates and applications in microtechnology and for anti-fouling.

BACKGROUND OF THE INVENTION

In general, functional surface materials (FSMs) may be broadly described as materials which exhibit a reversible response in response to a stimuli. The study of a variety of FSMs has attracted a great deal of attention due to the potential for exploitation of these reversible changes in a variety of uses. One good example of a FSM is poly(N-isopropylacrylamide) (PNIPAAm) which exhibits a shift from being hydrophobic to hydrophilic, or from hydrophilic to hydrophobic, in response to changes in temperature. As such, surfaces modified by PNIPAAm have attracted a great deal of research attention because of the potential for the application of the characteristics of PNIPAAm, such as molecular switching of the surface by altering interfacial properties. See Dagani, R. Chem. Eng. News, 1997, June 9, 27, and Snowdown, M.; Murray, M.; Chowdry, B. Chemistry and Industry, 1996, July 15, 531. Such uses are possible because PNIPAAm exhibits a lower critical solution temperature (LCST), and remarkable hydration-dehydration changes in response to relatively small changes in temperature, when placed in an aqueous solution. See Heskins, M.; Guillet, J. E.; James, E. J. Macromol. Sci. Chem., 1968, A2,1441. Below the LCST, PNIPAAm chains hydrate to form an expanded structure, and above LCST, PNIPAAm chains dehydrate to form a shrinkage structure. This property is due to the reversible formation and cleavage of the hydrogen bonds between the NH or C=O groups of PNIPAAm and the surrounding water molecules brought about with changes in the temperature. See Okubo, M.; Ahmad, H; Colloid Polym. Sci., 1995, 73, 817. Since PNIPAAm's physical properties are readily controlled by simply changing temperature, and without changing the chemical structure of the polymer, a broad range of potential uses for temperature-responsive PNIPAAm have been suggested. Among other uses, PNIPAAM can be employed in drug delivery systems, see Hoffman, A. S. J. Controlled Release, 1987, 6, 297, for solute separation, see Feil, H.; Bae, Y. H.; Jan, F.; Kim, S. W. J. Membrane Sci., 1991, 64, 283, in the concentration of dilute solutions, see Trank, S. J.; Johnson, D. W.; Cussler, E. L. Food Technol., 1989, June, 79, for the immobilization of enzymes, see Dong, L. C.; Hoffman, A. C. J. Controlled Release, 1986, 4, 223, for the coupling of biomolecules, see Matsukata, M.; Takei, Y.; Aoki, T.; Sanui, K.; Ogata, N.; Sakurai, Y.; Okano, T. J. Biochem, 1994, 116, 682, and for the preparation of photosensitive materials, see Suzuki, A.; Tanaka, T.; Nature, 1990, 346, 345.

In one example where PNIPAAm has been bonded to a substrate by using plasma-treated polystyrene dishes grafted with PNIPAAm, the alteration of the hydrophilic/hydrophobic properties of the surface was observed as a response to temperature change. See Okano, T.; Yamada, N.; Okuhara, M.; Sakai, H.; Sakurai. Y. Biomaterials, 1995, 16, 297. In this study, endothelial cells and hepatocytes attached and proliferated on the PNIPAAm grafted surface at 37° C., above the LCST of PNIPAAm. The cultured cells were readily detached from these surfaces by simply lowering the incubation temperature and without the usual damage associated with trypsinization. The radiation grafting utilized for this study had the advantage of being able to bind convalently the N-isopropylacrylamide (NPAAm) monomer onto a chemically inert surface without contamination by potentially hazardous catalyst fragments. However, a problem remains due to the inconvenience and expense of radiation machines and damage to the materials from radiation, especially damage to the polymer materials.

In another study involving a glass substrate, temperature sensitive surfaces were prepared by coupling either PNIPAAm with a terminal carboxyl end group or random copolymers of PNIPAAm and acrylic acid, with the amino group on the glass surface by a water soluble carbodiimide, such as 1-ethyl-3-(3-dimethyamino-propyl) carbodiimide hydrochloride. See Okano, T.; Kikuchi, A.; Sakurai, Y.; Takei, Y.; Ogata, N. J. Controlled Release, 1995, 36, 125. In this study, each PNIPAAm-grafted surface showed completely hydrophilic nature below 20° C. and a hydrophobic nature above the critical temperature. The coupling of amine and carboxyl groups involves the intermediary formation of the activated O-acylurea derivative of the carbodiimide. A subsequent nucleophilic attack by the primary nitrogen of the amino compound brings about the formation of the amide linkage with release of the soluble substituted urea. The formation of O-acylurea occurs optimally at pH 4–5. The intermediate has an extremely short life and rapidly undergoes hydrolysis or gives the N-acylurea adduct. The primary amino group of the nucleophile is predominantly protonated at this low pH and is rather unreactive. One the other hand, since it is an inhomogeneous reaction system, that is, the fact that reaction between the amine groups on the glass surface competes with the carboxyl groups on the polymer chains in solution, increases the difficulty of reaction. This limitation can severally restrict the yield of product under a variety of conditions. See Sehgal, D.; Vijay, I. K. Analytical Biochemistry, 1994,218,87.

Hydrogels, or water-swollen polymer gels, are one type of FSM which have attracted a great deal of attention in both theoretical studies and for real applications. See D. DeRossi, K. Kajiwara, Y. Osada and A. Yamauchi, Ed., Polymer Gels, Plenum Press, New York, 1989; P. S. Russo, Ed., Reversible Polymeric Gels and Related Systems, ACS Symposium Series 350, ACS, Washington, D.C., 1987; and N. A. Peppas, Ed, Hydrogels in Medicine and Pharmacy, Vol. 1, CRC Press, Boca Raton, Fla., 1986. These polymer gels can be divided into two kinds, those which do not exhibit significant sensitivity to environmental changes, and those which change their properties in response to a variety of environmental stimuli including pH, See K. Kataoka, H. Koyo and T. Tsurrta, Macromolecules, 28, 3336 (1995); and S. Nishi and T. Kotaka, Macromolecules, 19, 978 (1986), temperature, see Y. Kaneko, K. Sakai, A. Kikuchi, R. Yoshida, Y. Sakural and T. Okano, Macromolecules, 28, 7717 (1995); and T. Aoki, Y. Nagao, K. Sanui, N. Ogata, A.

Kikuchi, Y. Sakurai, K. Kataoka and T. Okano, Polymer. J, 28, .371 (1996); photo, A. Suzuki and T. Tanaka, Nature, 346, 345 (1990); and A. Fissi, O. Pieroni, G. Ruggeri and F. Ciardelli, Macromolecules, 28, 302 (1995), pressure, See D. W. Urry, L. C. Hayes, T. M. Parker, R. D. Harris, Chem. Phys. Lett., 201, 336 (1993), and electrical fields, See T. Tanaka, I. Nishio, S. T. Sun and S. U. Nishio, Science, 29,218 (1982). Among these, the temperature sensitive polymer gel, poly(N-isopropylacryamide) (PNIPAAm) has been of great interest because PNIPAAm demonstrates a lower critical solution temperature (LCST) and the temperature-dependent characteristics. See R. Dagani, Chem. Eng. News, June, 27 (1997); H. G. Schild, Prog; Polym. Sci., 17, 163 (1992); and M. Heskins, J. E. Guillet and E. James, J. Macromol. Sci., Chem., A2 (8), 1441 (1968). It swells with an extended chain conformation in aqueous solution below 32° C. and deswells with a compact chain conformation in aqueous solutions above 32° C. The phenomenon is caused by reverse formation and cleavage of the hydrogen bond between water molecules and hydrophobic molecular groups of PNIPAAm. The pentagonal water structure is suggested to be generated among water molecules adjacent to the hydrophobic molecular groups of PIPAAm. See D. W. Urry, Scientific American, Jan., 64 (1995). Since the pentagonal structure is stable at low temperature and unstable at high temperature, the reverse swelling-deswelling process can be observed with the variation of environmental temperature. As the volume phase transition brings about dramatic changes in the physical properties of the PNIPAAm gels, PNIPAAm and its copolymer gels are expected to be applied as the new types of materials, for example as actuators, See M. Snowden, M. Murray and B. Z. Chowdry, Chemistry and Industry, 15, 531 (1996), as temperature-modulated bioconjugaters to control enzyme activity, See L. C. Dong and A. S. Hoffman, J. Controlled Release, 4, 223 (1986) and as separation modules to extract water from the solution of macromolecules, See R. F. S. Freitas and E. L. Cussler, Chemical Engineering Science, 42, 97 (1987). Stimuli-responsive PNIPAAm gels have promising potential to achieve intelligent drug delivery system because it can be utilized as molecular device for self regulating drug delivery. See J. Riccka and T. Tanaka, Macromolecules, 17,2916 (1984); A. Gutowska, Y. H. Bae, H. Jacobs, J. Feijen and S. W. Kim, Macromolecules, 27,4167 (1994); S. Shoemaker, A. S. Hoffman and J. H. Priest, Appl. Biochem. Biotechnol, 15, 11 (1987) and H. Kurahashi and S. Furusaki; J. Chem. Eng. of Japan, 26, 89 (1993). One disadvantage of PNIPAAm gel is the poor mechanical properties. When the gels are fully swollen and absorbed by large amounts of water, the gels become unstable and are easily damaged by the effects of small stresses.

Surfaces modified by PNIPAAm to achieve the characteristics of hydrophobic/hydrophilic reverse change have also received a great deal of attention. See H. Iwata, M. Odata, Y. Uyama, H. Amemiya and Y. Ikada, J. membrane Sci., 55, 119 (1991); Y. M. Lee, S. Y. Ihm, J. K. Shim, J. H. Kim, C. S. Cho and Y. K. Sung, Polymer, 36, 81 (1995); and H. Kubota, N. Nagaoka, R. Katakai, M. Yoshida, H. Omichi and Y. Hata, J. Appl. Polym. Sci., 51, 925 (1994). Most of research work is concerned with the formation of thin PNIPAAm layer on the substrates by chemical grafting, See T. Okano, N. Yamada, H. Sakai and Y. Sakurai, J. Biomed. Mater. Res., 27, 1243 (1993), and plasma, See Y. G. Takei, T. Aoki, K. Sanui, N. Ogata, Y. Sakuarai and T. Okano, Macromolecules, 27,6163 (1994). Such surfaces modified by PNIPAAm layer exhibit the reverse change of hydrophobic/hydrophilic properties and can be used in the incubation process of cells. See T. Okano, A. Kikuchi Y. Sakurai, Y. Takei and N. Ogata, J. Controlled Release, 36, 125 (1995).

While prior art methods of attaching FSMs to substrates have some utility, many potential applications which would exploit the variable properties of FSMs require improved methods for attaching FSMs to substrates. Similarly, improved methods of attaching FSMs to substrates make possible new uses for FSMs in applications in microtechnology and for the use of FSMs as membranes or coatings used in the prevention of fouling, or anti-fouling. As such, there exists a need for improved methods for bonding FSMs to substrates and a need for new applications for FSMs in microtechnology and for anti-fouling.

SUMMARY OF THE INVENTION

Accordingly, the present invention relates to improved methods of attaching FSMs to substrates and new uses for FSMs in applications in microtechnology and as membranes or coatings used in the prevention of fouling, or anti-fouling. In one preferred embodiment of the present invention, a simple and effective method to bond a thin coating of N-isopropylacylamide (NIPAAm) on a glass surface by UV photopolymerization is shown. A substrate is first provided. The substrate may be any material upon which hydroxy groups may be generated. One example of such a substrate would be a glass where "glass" is defined as an amorphous solid with no long range order and which contains either $SiO_2$ or $P_2O_5$. A photosensitizer, which is a molecule having a silane coupling agent at one end and a terminal bonding group at the other end, is then provided. The silane coupling agent is either Si bonded to a halogen or Si bonded to an alkoxy group. The terminal bonding group may be any group which will generate radicals in the presence of a stimuli, such as a dithiocarbamate group in the presence of UV light. In this preferred embodiment, the photosensitizer is selected as (N,N'-diethylamine) dithiocarbamoylpropyl-(trimethoxy) silane (DATMS). The thiocarbamate group is then bonded to the glass surface by coupling the silane agent with the hydroxyl groups on the glass surface. Subsequently, the silane modified surface is exposed to a solution of NIPAAm and a crosslinking agent in a polar solvent. The crosslinking agent may be any organic molecule having an acrylamide group and at least two double bonds in the organic molecule's structure which will dissolve in the polar solvent. Preferably, the crosslinking agent is provided as N, N'-methylenebisacrylamide. The polar solvent may be any polar liquid which will dissolve the monomer and the crosslinking agent. Preferably, the polar solvent is selected from the group acetone, water, ethanol, or combinations thereof. By exposing the glass surface to a UV light, free radicals are generated in the thiocarbamate group which then bonds to the crosslinking agent and the NIPAAm. Upon bonding, the cross linking agent and the NIPAAm polymerize to form a thin coating of PNIPAAM bonded to the glass.

In another preferred embodiment, the use of such a coated surface in nano and micro technology applications is shown. Depending upon the particular configuration of the substrate, the properties of the PNIPAAm allow applications in micro and nano technology. For example, the PNIPAAm may be utilized to remove unwanted particulate matter in a microchannel by coating the microchannel with the PNIPAAm. By varying the temperature of the microchannel, the hydrophobic/hydrophilic properties of the PNIPAAm can be used to repel a variety of fouling agents depending on their polarity. Also, by coating the interior of a capillary tube with PNIPAAm and varying the temperature along the length of the capillary, the hydrophobic/hydorphilic properties of the PNIPAAm can be used to move a liquid through the tube.

In another preferred embodiment, a substrate is coated with PNIPAAm by directly polymerizing the NIPAAm monomer with the vinyl groups on the glass surface directly in the presence of N,N'-methylenebisacrylamide as a crosslinking agent. In this embodiment, the vinyl groups are introduced on the glass surface by the condensation reaction of vinylsilane and hydroxyl groups on the glass surface.

In another preferred embodiment, FSMs are used for antifouling in microchannels. In another preferred embodiment, FSMs are used to force convection within a micromachine contactor without mechanical intervention. Finally, in another preferred embodiment, FSMs are used for controlled permeability in microchannels.

OBJECTS

It is thus an object of the present invention to provide a method for providing a coating of a functional surface material (FSM) bonded to a substrate.

It is a further object of the present invention to provide a substrate with a FSM coating bonded thereon.

It is a further object of the present invention to provide a method for providing a thin coating of PNIPAAm bonded to a glass surface.

It is a further object of the present invention to provide a glass surface with a thin coating of PNIPAAm bonded to the glass surface.

It is a further object of the present invention to provide a method for providing a thin coating of PNIPAAm bonded to a glass surface by bonding hydroxyl groups present in the glass surface to a silane coupling agent having a thiocarbamate group and bringing a solution of a N-isopropylacrylamide monomer, a crosslinking agent, and a polar fluid, into contact with the thiocarbamate group thereby bonding and polymerizing the N-isopropylacrylamide monomer and the crosslinking agent to form a thin layer of poly(N-isopropylacrylamide) bonded to the glass surface.

It is a further object of the invention to provide the glass as selected from the group of silicon dioxide, boric oxide, aluminum oxide, and phosphorus pentoxide.

It is a further object of the present invention to provide the crosslinking agent as an organic molecule having an acrylamide group and at least two double bonds in the organic molecule's structure.

It is a further object of the invention to provide the crosslinking agent as N,N'-methylenebisacrylamide.

It is a further object of the invention to provide the polar fluid as selected from the group comprising acetone, water, ethanol, or combinations thereof.

It is a further object of the invention to provide the silane coupling agent as (NN'-diethylamine) dithiocarbamoylpropyl-(trimethoxy) silane.

It is a further object of the invention to provide a glass surface bonded to a silane coupling agent having a thiocarbamate group, the thiocarbamate group bonded to a thin layer of poly(N-isopropylacrylamide) and a cross linking agent.

It is a further object of the invention to provide a glass mirochannel surface bonded to a silane coupling agent having a thiocarbamate group, the thiocarbamate group bonded to a thin layer of poly(N-isopropylacrylamide) and a crosslinking agent.

It is a further object of the invention to provide a glass capillary fluid pump having an interior and an exterior surface wherein the interior surface is bonded to a silane coupling agent having a thiocarbamate group, the thiocarbamate group bonded to a thin layer of poly(N-isopropylacrylamide).

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 8(a) shows vinyl groups grafted on the oxide surface by VTMS;

FIG. 8(b) shows vinyl groups grafted on the oxide surface by VDCS; and

FIG. 8(c) shows NIPAAm and BisAAm grafted on the organosilane modified surface.

DESCRIPTION OF THE PREFERRED EMBODIMENTS

Figure 1:
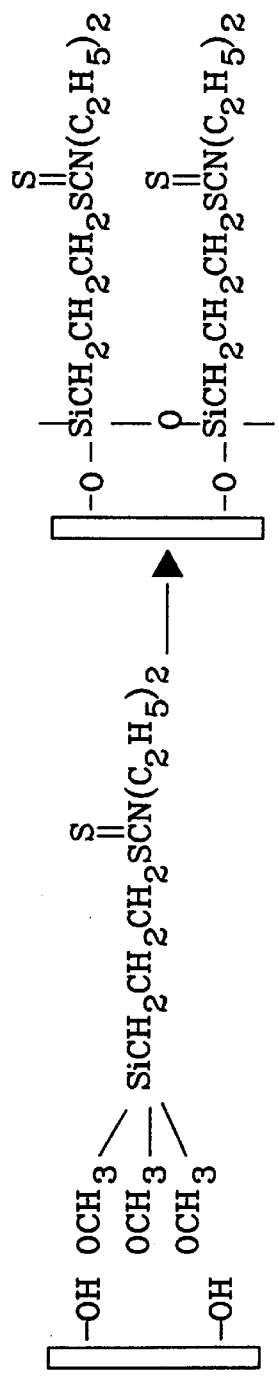
FIG. 1. is a schematic of photopolymerization on a glass plate according to the present invention.
Figure 1:
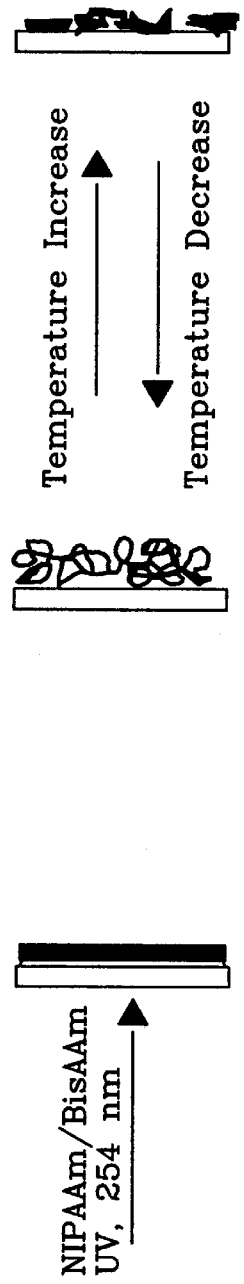
Figure 1:
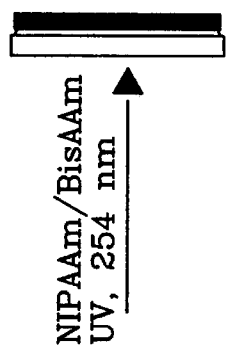

In an experiment which demonstrated a preferred embodiment of the present invention, a UV photografting polymerization of NIPAAm onto a glass surface was investigated. The glass surface was first treated with a photosensitive silane coupling agent, (N,N'-diethylamine) dithiocarbamoylpropyl-(trimethoxy) silane (DATMS) and then grafted with PNIPAAm at the action of UV light. The thickness of the resultant gel was measured at less than 1 mm. The characteristics of modified surface exhibited rapid, reversible and significant changes in its hydrophilic/hydrophobic properties. This temperature sensitive polymer was then used as the convertible coated layer in interior of a capillary tube. The reverse change of water meniscus height in the capillary tube was demonstrated as having been caused by the reverse change of the hydrophobic/hydrophilic nature of the surface of capillary tube. This strategy can readily be applied to provide an antifouling technique for the surface of microchannels.

Materials

The materials used for the experiment were N-isopropylacrylamide (NIPAAm, 97%, Aldrich) which was recrystallizaed in hexane. Chloropropyltrimethoxysilane (CPTMS, 97%, Aldrich) was purified by reduced pressure distillation. Acetone (99%, Aldrich), dichloromethane (99%, Aldrich) and anhydrous toluene (99.8%, Aldrich) were distilled before use. Sodium N, N'-diethyldithiocarbamate (SDDC) was recryslized from methanol. N N'-methylenebisacrylamide (BisAAm, 99%, Aldrich) was used without further purification. Ultrapure water with the conductivity of 18 Scm-1 was used in whole experiments. Glass plates and quartz capillary tubes with the inside diameter of 2.0 mm were obtained from Clay Adams and Quartz Sci. Inc.

Preparation of Photosensitizer

Photosensitizer, (N,N'-diethylamine) dithiocarbamoylpropyl-(trimethoxy) silane (DATMS) was synthesized as following procedure: The reaction was performed in one flat bottom flask with three necks (250 ml). 12.0 g of CPTMS and 4.0 g of SDDC was dissolved in 100 ml of acetone and mixed by one magnetic stirrer at room temperature. The mixture solution was refluxed for 48 hours at temperature of 56° C. During the reaction, white precipitation of NaCl as the byproduct was observed in the bottom of flask. After cooling the solution, NaCl was separated by the vacuum filtration. Then, unreacted CPTMS and residence solvent were evaporated by reduced pressure distillation. A viscous and yellow colored liquid (DATMS) was obtained. The efficiency of the conversion reaction was around 60%.

Modification of Glass Surface

A glass plate of 20×0.5×0.1 mm3 and a quartz capillary tube 40 mm in length and 2 mm in diameter were used as substrates. The substrates were precleaned by immersing them into 1 N HNO3 aqueous solution containing 1 wt. % HF overnight at room temperature. The glass plate and capillary tube were rinsed with a large volume of ultrapure water, the free water was then blown off with a strong flow of nitrogen gas and dried in oven at 30° C. overnight. DATMS was introduced on the substrate surfaces by immersing the glass plate and quartz capillary tube into 50 ml of anhydrous toluene containing 4.0 g of DATMS. The solution was refluxed at temperature of 110° C. for 12 hours. The glass plate and capillary tube were rinsed in acetone for three minutes and aged in an oven at 70° C. for one hour. The modified glass plate and capillary tube were then used immediately to avoid any damage to the surface.

Photopolymerzation of NIPAAm

UV photopolymerization of NIPAAm was performed in a quartz cell (10×10×50 mm3) with rubber septa. 0.5 g of NIPAAm and 0.01 of g BisAAm were dissolved in 10 ml of acetone at room temperature. The resulting solution was then poured into the quartz cell. The cell was vacuumed and then filled with nitrogen gas. This process was repeated three times and finally nitrogen gas was filled in the upper space of cell. The photopolymerization of NIPAAm was initiated by exciting the quartz cell with a high-pressure mercury lamp with a UV wavelength at 254 nm. The output power of the lamp was 17 W and the distance from the lamp to the glass plate was 50 mm. After 12 hours, the glass plate and quartz capillary tube was removed from the cell and a smooth crosslinked PNIPAAm film having a thickness less than 1 mm was observed on the surface of substrates. Then, the substrates were rinsed by a larger volume of dichloromethane and water, respectively, and immersed in ultrapure water overnight to remove any unreacted monomer and residue solvent. Finally, they were dried in hood at room temperature.

Characterizations

UV and FTIR spectra of DATMS were recorded by a UV double-beam spectrophotometer (Car 1E, Varian) and FTIR instrument (OMNIC). The static contact angles of samples were measured by a contact angle goniometer (100-00, rame-hart Inc.). Ultrapure water was used as solvent and the measurements were carried out at room temperature. Surface characteristics of the glass plate modified by PNIPAAm were investigated by a dynamic contact angle instrument (DCA-312, Cahn Instrument Inc.). The temperature of the testing chamber was controlled by a thermostated circulator to 0.2° C. The advancing and receding contact angles, and the surface tension of the glass plate, was measured at an immersion speed of 6 mm/min with a 15 mm immersion depth. Each measurement took five consecutive strokes. The data of last three strokes was used to calculate the contact angle with the standard calculation procedure (DCA4A, Cahn Instrument Inc.). The mean results are reported here with 95% confidence. The change of water meniscus height was recorded by a ruler when the capillary tube was dipped into water having different temperatures. Because the inner surface of capillary tube was grafted with PNIPAAm, a reverse change of hydrophilic/hydrophobic surface properties was observed on the wall of the capillary tube when it was immersed in water with different temperatures. At a temperature higher than the LCST of PNIPAAm, the surface of capillary was hydrophobic and repelled water. Therefore, the water meniscus of capillary tube reached the lowest position, compared with the highest position when the surface of capillary tube showed hydrophilic properties at the temperature lower than LCST of PNIPAAm.

Results and Discussion

Figure 2:
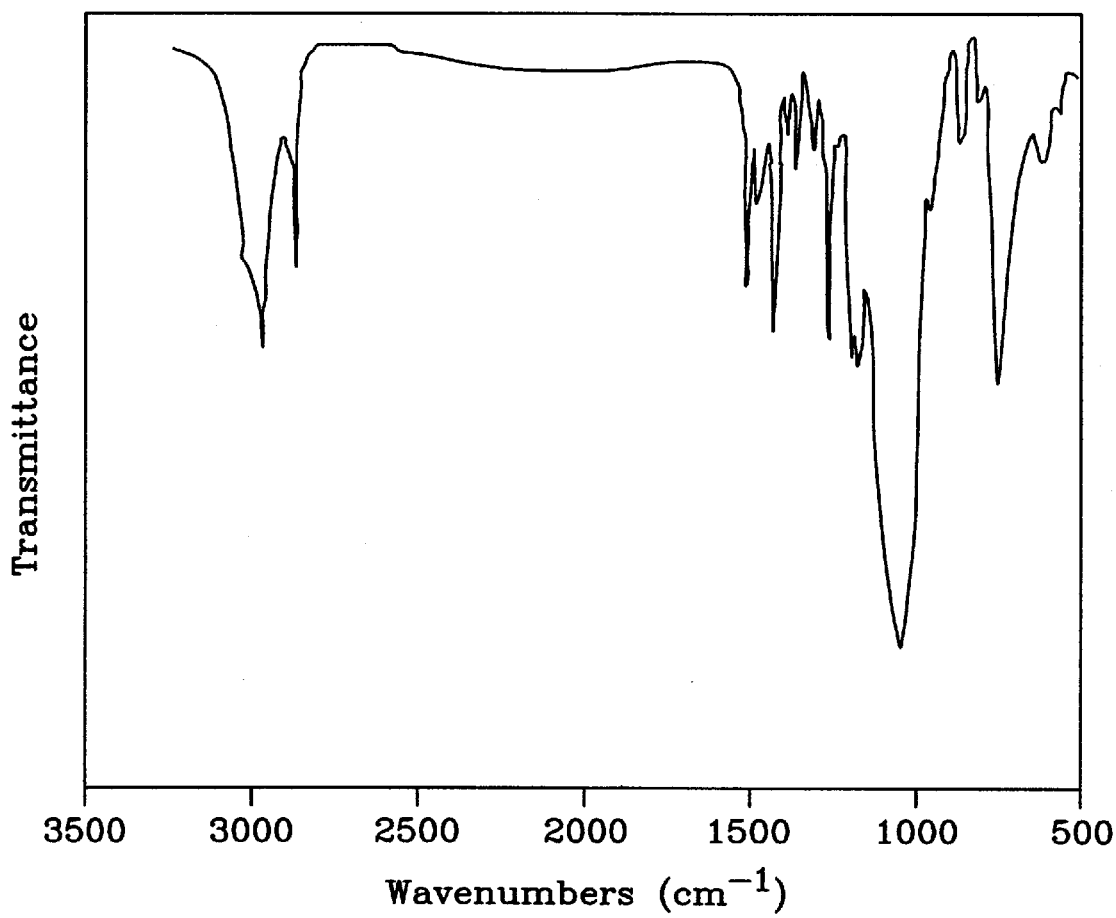
FIG. 2. is a UV spectra of the photosensitizer DATMS utilized in the present invention.
Figure 3:
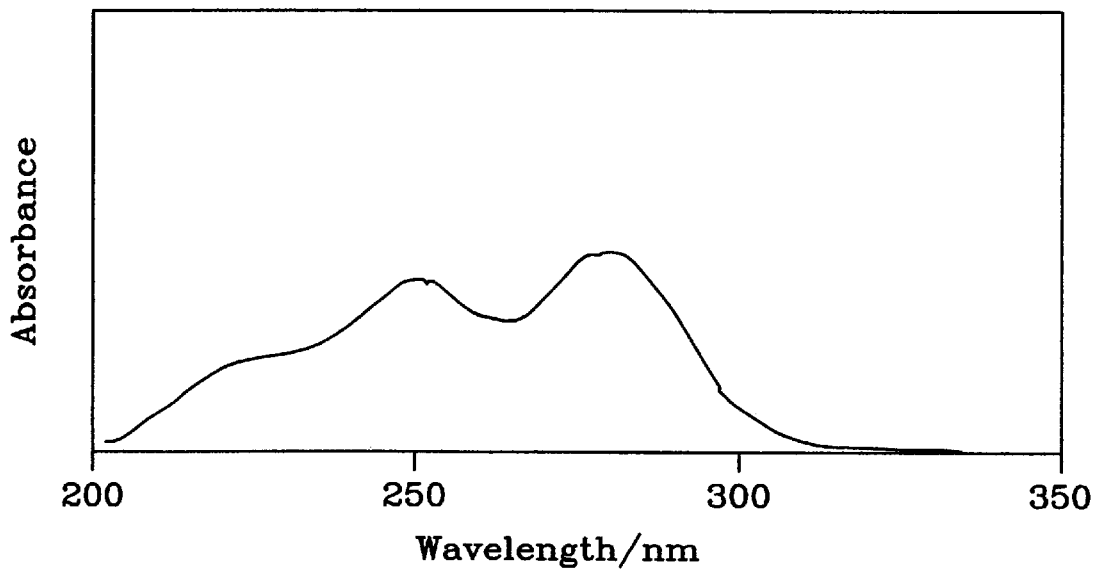
FIG. 3. Is a FTIR spectra of the photosensitizer DATMS utilized in the present invention.

The schematic diagram of the photografting NIPAAm onto glass plate is shown in FIG. 1. FIG. 2 shows FTIR spectra of DATMS. The C—H stretching bands of the propyl group and asymmetric stretch of the methoxy group fall together in one broad peak at 2944 cm-1. The —CH2 scissoring vibration can be found at 1412 cm-1. The strong bands at 1082 and 820 cm-1 are attributed to Si—O and Si—O—C stretching modes. A series of weak peaks at 918, 995, 1280, 1270, 1350 and 1485 cm-1 are assigned to the dithiocarbamate group. FIG. 3 shows the UV spectra of DATMS, with dichloromethane as the solvent. Two characteristic absorption peaks at 250 and 280 nm are attributed to N—C—S and S—C=S conjugation. An UV light at 254 nm wavelength was employed to activate DATMS since DATMS exhibits maximum absorption at this wavelength. The C—S bond was broken to generate free radicals as the effect of UV light and the free radicals can attack the vinyl groups on both NIPAAm and BisAAm and, consequently, generate the crosslinked PNIPAAm layer on the glass piece.

The results of the static contact angle measurements show that the clean glass plate surface treated with 1N HNO3 solution containing 1 wt. % HF wets with water (=26.8) because of the hydroxyl groups on the surface. After being treated with DATMS, the glass plate surface was relatively hydrophobic (=71.5) since the surface was covered with hydrocarbon groups. Formation of the crosslinked NIPAAm layer reverted the hydrophobic DATMS surface to a hydrophilic surface (0). The distinct difference in contact angle data made it easy to monitor the surface modification of substrates during each step of the synthesis.

Figure 4:
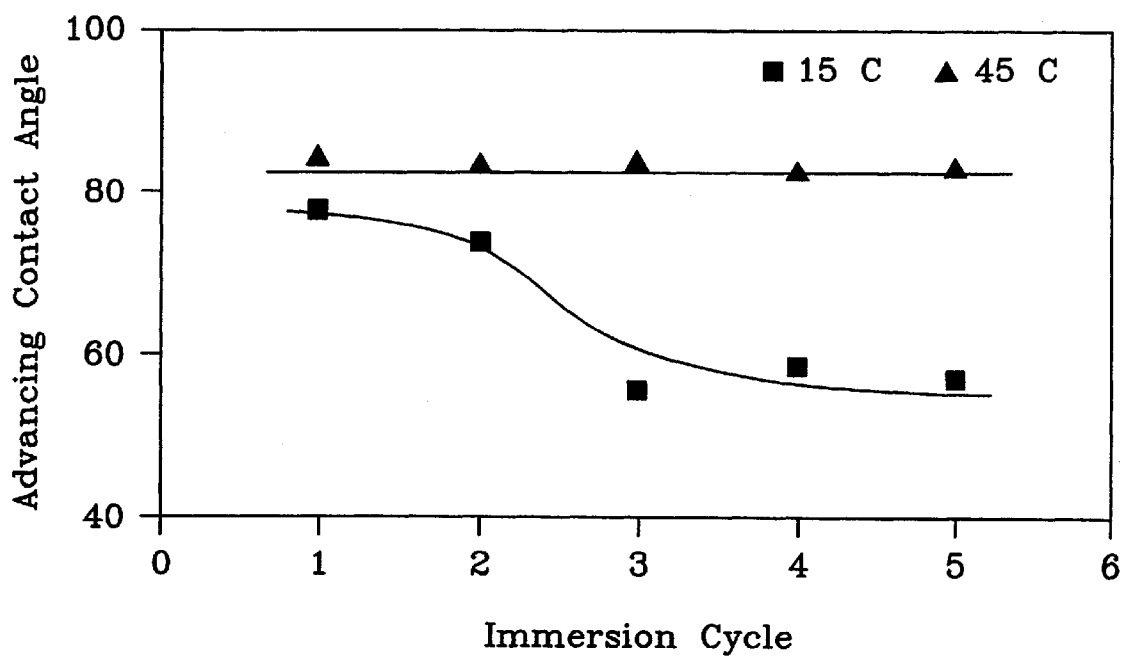
FIG. 4. is a graph showing the immersion cycle and advancing contact angle of a glass plate surface coated by a crosslinked PNIPAAm layer according to the present invention.

The surfaces of the glass plate with the crosslinked PNIPAAm layer demonstrated a rapid and dramatic change of reversible hydrophilic-hydrophobic surface properties in response to variations in environmental temperature. Such characteristics were investigated further by means of dynamic contact angle measurements using ultrapure water as a probe liquid. FIG. 4 shows the change of advancing contact angle of glass plate surface with the measurement times, indicating the immersion cycle. The measurement temperatures are 15 and 45° C., respectively. It is noted that the coated glass plate exhibits the relative hydrophobic property, i.e. with higher advancing contact angle at the first and second immersion cycle, even at when measurement temperature of 15° C., or below the LCST of NIPAAm. This is because the initially dry state of PNIPAAm has a hydrophobic nature. However, the surface of coated glass plate exhibits a hydrophilic property after it was wetted in the third immersion cycle. This phenomena can be attributed the fact that more hydrogen bonds were formed around both NH and C=O groups and that the crosslinked PNIPAAm layer was swollen gradually in water. In contrast, at 45° C., above the LCST of PNIPAAm, the surface property of the coated glass plate was independent of the immersion cycle and showed a relative hydrophobic property. This is because the PNIPAAm chains will shrink to form a compact structure with the more hydrophobic component on the outside of polymer chains at the temperature above the LCST.

Figure 5:
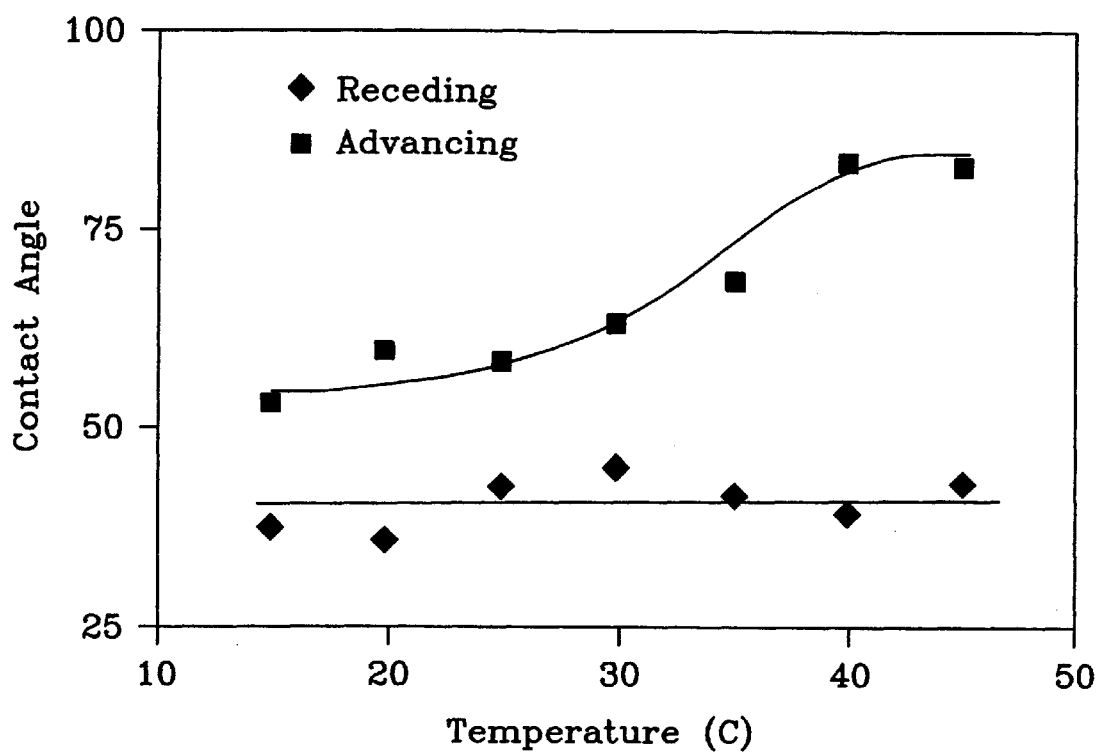
FIG. 5. is a graph depicting the effect of temperature on advancing and receding contact angles of glass plate surface coated by a crosslinked PNIPAAm layer according to the present invention.

The advancing contact angle changes as a function of temperature are shown in FIG. 5. The advancing contact angle increases with increasing temperature. The transition temperature, i.e. the temperature at which a remarkable change of contact angle is observed, is around 35° C. Above this temperature, the surface exhibits a hydrophobic property. Below this temperature, the surface has a relatively hydrophilic property. It is well known that the LCST of linear PNIPAAm is at 32° C. and the breadth of transition changes is approximately 1° C. The incorporation of hydrophobic comonomers leads to a lower LCST and hydrophilic comonomer to a higher LCST. The changes in LCST caused by incorporation of comonomers are due to the changes in overall hydrophilic nature of the polymer. Except for the effect of comonomers on the LCST of PNIPAAm, the conformation of PNIPAAm chains also plays a critical role to change the LCST of polymer. The effect of different conformations of PNIPAAm chains has been investigated. It has been found that the surface modified by terminal grafting PNIPAAm exhibits lower transition temperature than the surface modified by multipoint grafting surface with increasing temperature. The breadth of transition changes for terminal grafting surface were narrower than that for mutilpoint grafting surface. The multipoint grafting conformation constrains the dehydration of polymers and prevents aggregation of the dehydrated polymers. Therefore, the transition temperature increases and the transition breadth becomes wider. Similar results were also found in the glass surface modified by crosslinked PNIPAAm gel formed by initiator. With increasing amount of crosslinking agent, corresponding to an increased crosslinking density in the gel, both the transition temperature and breadth increase. The. variation of receding contact angle with the temperature is also shown in FIG. 5. It is clear that the receding contact angle is independent of the temperature. This is because the advancing contact angle is associated with a disperse component and receding contact angle is mainly attributed to a polar component.

Figure 6:
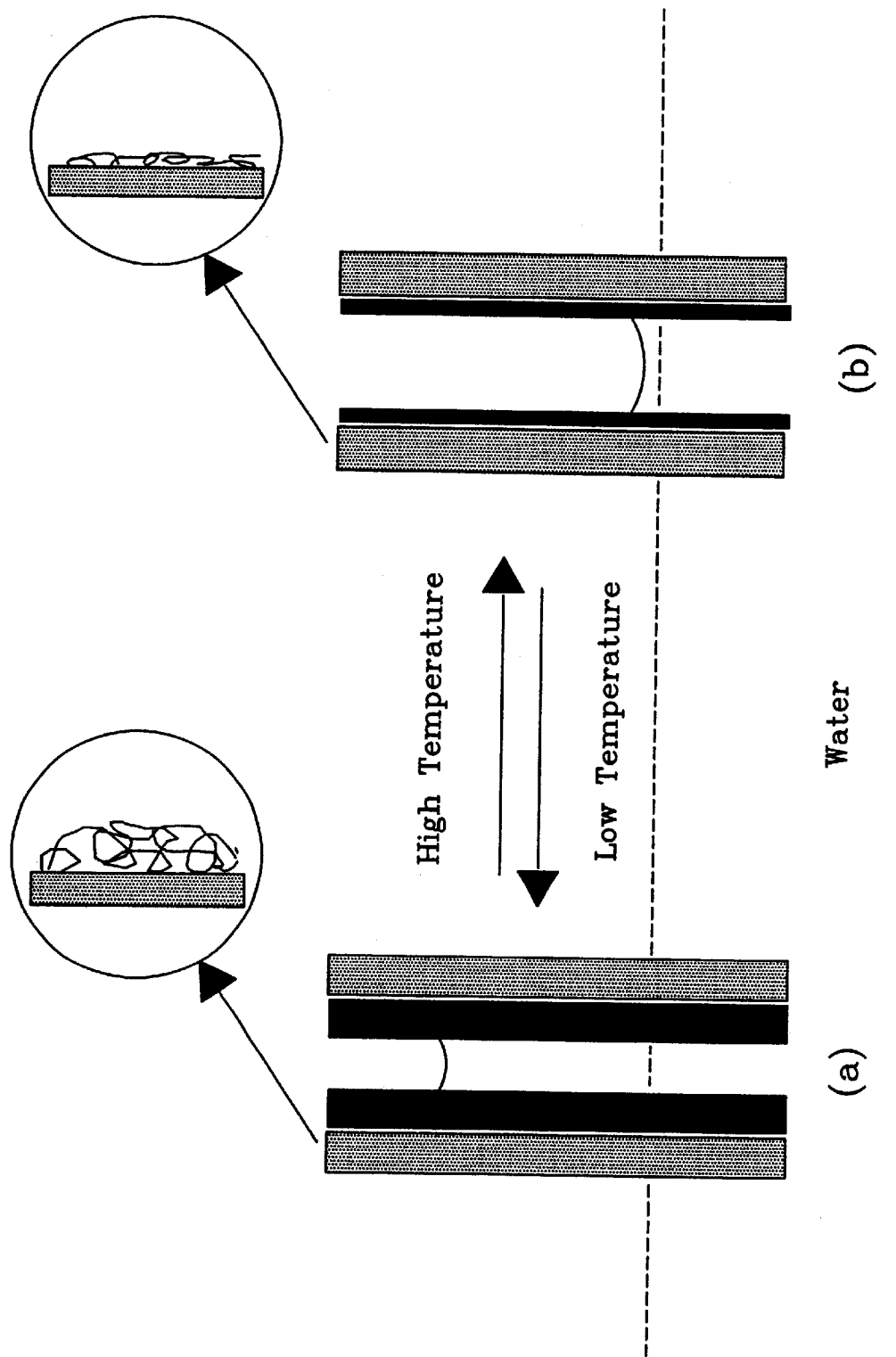
FIG. 6. is a schematic illustration of the change of meniscus height in a capillary tube with the interior of the capillary tube coated by a crosslinked PNIPAAm layer according to the present invention.

The reverse change of water meniscus height in the capillary tube can be observed by immersing the capillary tube vertically in the water at low temperature (20° C.) and high temperature (40° C.). The total difference of water meniscus height change was 7.0 mm in a capillary tube with inside diameter of 2.0 mm. When the end of the capillary tube was first immersed in water with low temperature (20° C.), the water inside the capillary tube rose 7 mm above the water level outside of the tube because of the hydrophilicity of the surface as shown in FIG. 6(a). When the capillary tube was in contact with water at high temperature (40° C.), the surface of capillary tube become hydrophobic and water did not rise above the outside water level as shown in FIG. 6(b).

Figure 7:
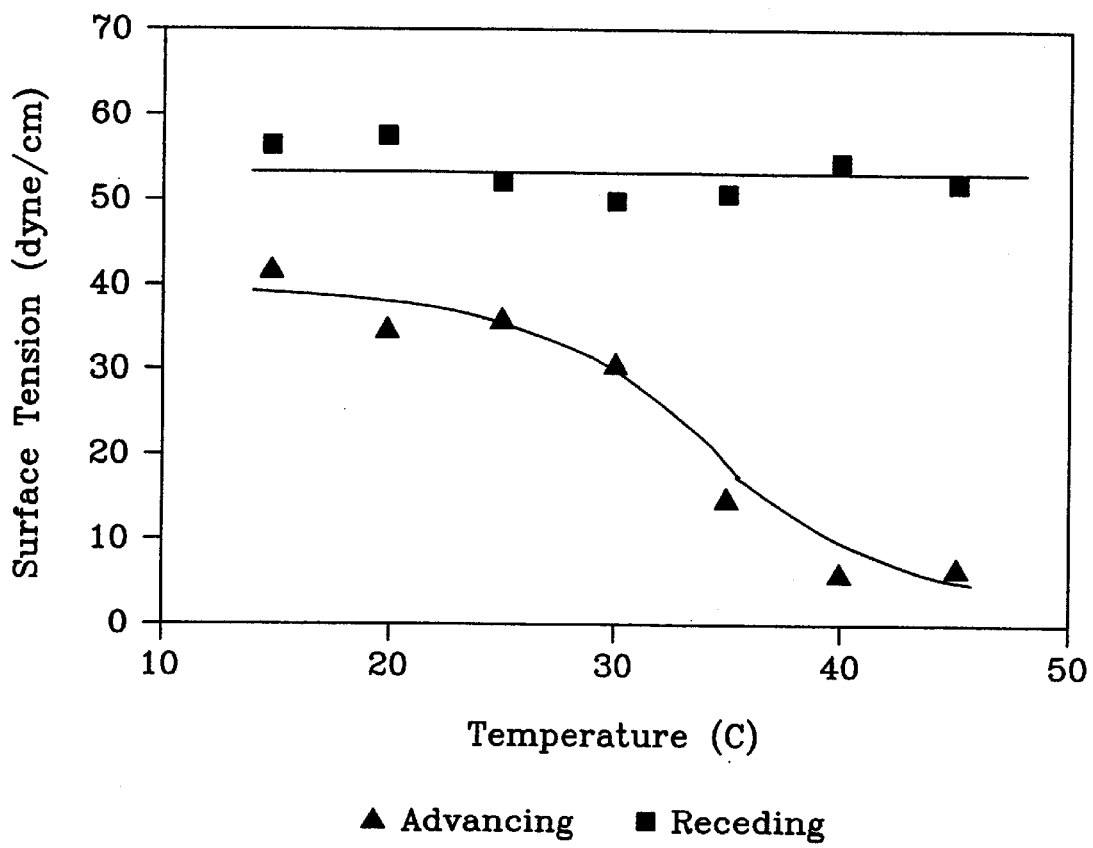
FIG. 7. is a graph showing the effect of temperature on the advancing and receding surface tensions of a glass slide coated by a crosslinked PNIPAAm layer according to the present invention.

FIG. 7 shows the effect of temperature on the advancing and receding surface tension of a glass plate grafted by crosslinked PNIPAAm film. The receding surface tension was unchanged at the range of measurement temperature, which is consistent with the observation of the receding contact angle. The advancing surface tension decreases with increasing temperature. Around a temperature of 30° C., a large change of surface tension was evident as shown in FIG. 7. This large change is related to the LCST temperature. The hydrophilic surface moistens water but the hydrophobic surface repels water. This capillary action is a consequence of surface tension. The former increases interaction between water and glass plates through hydrogen bonding, resulting in high surface tension and latter reduces or eliminates hydrogen bonding between them, resulting in low surface tension. The hydrogen bonding between the water and the glass plates overcomes the weight of water and is observed as a rising water column in the capillary tube. No rising water column is observed at a high temperature because of the weaker interaction between the water and the hydrophobic capillary walls.

In a second experiment which demonstrated another preferred embodiment of the present invention, composite crosslinked poly(N-isopropylacrylamide) (PNIPAAm) gels were prepared by grafting N-isopropylacrylamide on the surface of glass plates modified by organosilanes. In this embodiment, the use of glass plates as a substrate increased the mechanical strength of composite PNIPAAm gel layers. The effects of a series of organosilanes and the reaction time of the organosilanes on the surface characteristics, such as the static contact angle and the layer thickness, were investigated. The equilibrium swelling ratio and the water release behavior of the gel layers were examined in terms of the crosslinking density of the composite gels. The composite gels exhibited not only the characteristics of remarkable water release but also of reversible hydrophilic/hydrophobic surface properties. The gel layers were shown to be hydrophilic under 25 C and to change to hydrophobic above 40 C.

The main purpose of present study was to develop a technique to generate the composite crosslinked PNIPAAm gel layers with covalent linkages on the surface of ceramic plates, such as a glass plate. The composite crosslinked PNIPAAm gels were prepared by first introducing vinyl groups on the glass surface, then grafting NIPAAm with vinyl groups by radical polymerization at the presence of crosslinking agent. The use of a glass plate as a substrate increased not only the strength of composite gels, especially with lower crosslinking density, but also kept the size of composite gels unchanged in the horizontal direction. Meanwhile, the thick layer of PNIPAAm gel makes it possible to deswell or swell a large volume of water by the process of reversing the surface properties. This strategy may be employed to develop temperature sensitive controlled release systems, which consist of the porous ceramic materials as the interior reservoir of chemicals and the thick coating layer with the temperature sensitive polymer gels as the delivering media. See A. S. Hoffman, J. Controlled Release, 6,297 (1987).

Materials

The materials used for the experiment were N-isopropylacrylamide (PNIPAAm, 97%, Aldrich) and potassium persulfate (K2S2O8, 99%, Aldrich) were purified by recrystallization from hexane and ethanol, respectively. N, N-methylenebisacrylamide BisAAm, 95%, Aldrich), N, N, N', N'-tetramethylethylenediamie (TMEDA, 99%, Aldrich), vinyldimethylchlorosilane (VDCS, Gelest), vinyltrimethyoxysilane (VTMS, Gelest), decyltrichlorosilane (DTCS, Gelest) and methylacryloxypropyltrimethoxysilane (MAPTS, Gelest) were used without purification. Methanol (99.8%, Aldrich), ethanol (99.8%, Aldrich) and anhydrous toluene (99.8%, Aldrich) were distillated before use. Ultrapure water with conductivity of 18 Scm−1 was used in all experiments. Glass plates with the thickness of 1 mm and silicone wafers with the thickness of 0.5 mm were received from Clay Adams and Wafer Net Inc., respectively.

Surface Modifications

The silicone wafers and the glass plates used as substrates were cut to 20×10 mm and washed by ethanol and ultrapure water, respectively. They were immersed in a preclean agent, 1N HNO3 aqueous solution containing 1% HF for overnight at room temperature, and then rinsed thoroughly with ultrapure water. During this process, hydroxyl groups were generated on the surface of substrates as shown by contact angle measurements. To couple the organosilane on the surface of silicone wafers and glass plates, the dried silicone wafers and glass plates were dipped in 5% (v/v) solution of organosilane in anhydrous toluene. The reactions were performed at room temperature in a plate bottom flask with one-neck (250 ml), under a nitrogen atmosphere. The solution in the flask was stirred by one orbit shaker (Lab Line Instrument Inc.). The samples were taken out at different times and rinsed three times for 1 minute each in toluene. Finally, the samples were cured in an oven at 100 C for 5 min and stored in vacuum oven at room temperature before measurements.

Figure 8:
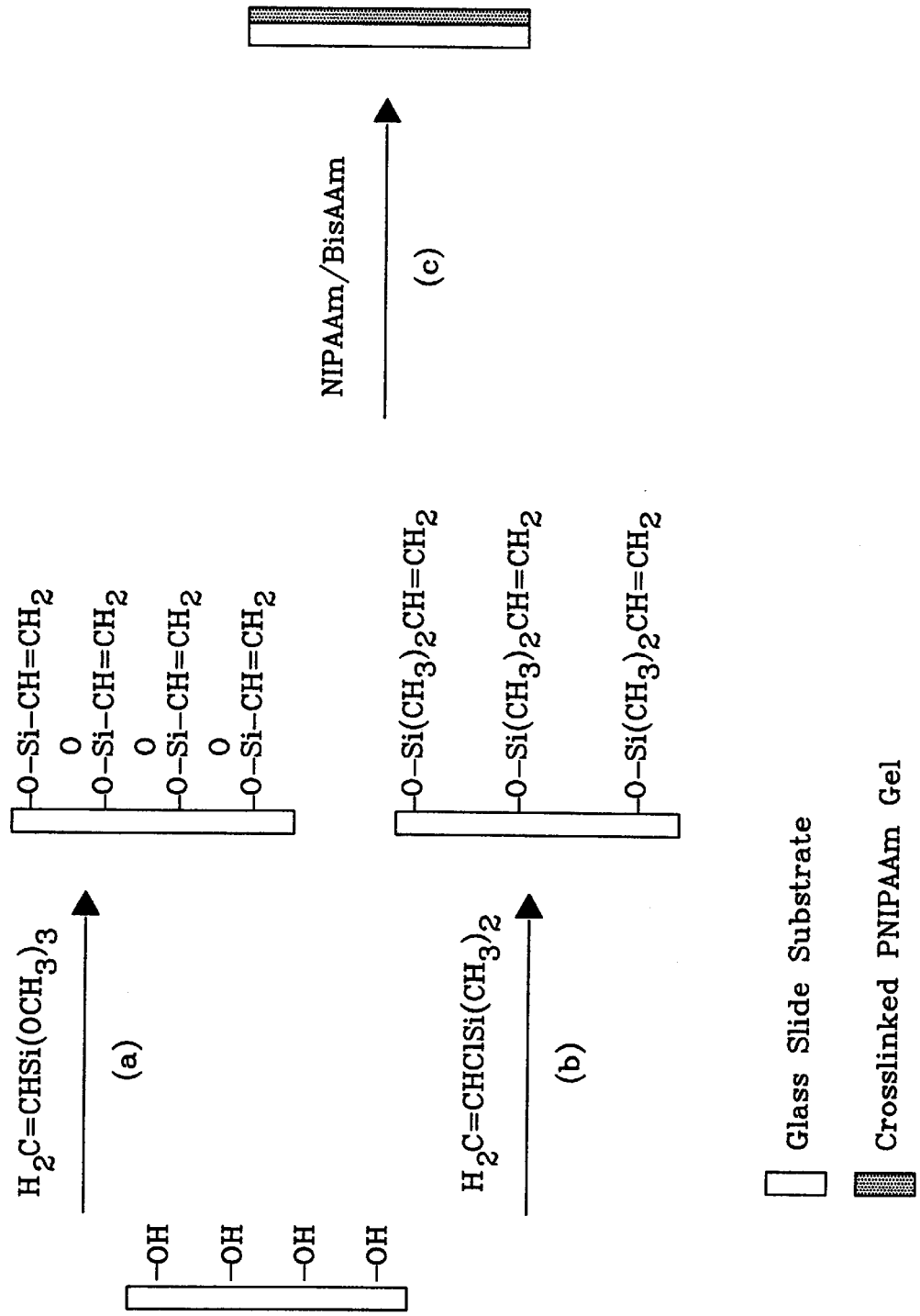
FIG. 8. is a schematic illustration of the preparation of composite crosslinked PNIPAAm gels where

Preparation of Composite Crosslinked PNIPAAm Gels:

The preparation method of composite crosslinked PNIPAAm gels can be schematically demonstrated as shown in FIG. 8. Two methods can be employed to introduce the vinyl groups on the surface of substrates. One is by the condensation reaction of alkoxysilane, such as VTMS and OH groups, the other is by the condensation reaction of chlorosilane, such as VDCS and OH groups. The reaction was performed in a round bottom flask with one neck (100 ml). The typical reaction procedure is as follows: 1.0 g of NIPAAm, 0.03 g of BisAAm and 0.01 g of K2S2O8 were dissolved in 20 ml of water, in which the glass piece was immersed. The flask was first vacuumed and subsequently filled with nitrogen. This process was repeated three times. To initiate the polymerization, 0.2 ml of TMEDA was added to the solution by syringe. The temperature of polymerization was kept at 6 C by immersing the flask into bath mixture of water and ice. During the polymerization, the gel was gradually generated on the surface of glass plate and in the solution. The composite crosslinked PNIPAAm gels with glass plate as the substrate and the crosslinked PNIPAAm gel (~2 mm) as the top layer was made by carefully separating the glass plate from the gel and washing the gel with a large volume of water. The composite gels are stable in water and did not show any sign of peeling after more than six months storage in water.

Static Contact Angle

The static contact angle of water on the surface of substrates was measured by a contact angle goniometer (100-00, rame-hart, inc.). One water drop (10 (l) was deposited on the dry surface of the silicone wafer or glass plate. The measurement was performed as soon as possible after the sessile drop of water was formed on the surface of substrates. The static contact angle was then read directly from goniometer. All measurements were carried out at room temperature with humidity of about 40%. The five points on the surface were chosen random to perform the measurements. The mean data were taken as final data as shown in following discussion and the results have standard deviations less than 5%.

Dynamic Contact Angle and Surface Tension

The dynamic contact angle and surface tension of the glass plates with and without the grafted PNIPAAm gel were measured using a dynamic Wilhelmy plate technique. See L. Smith, C. Doyle, D. E. Gregonis and J. D. Andrade, J. Appl; Polym. Sci., 26, 1269 (1982). (DCA-312, Cahn Instrument Inc.). The temperature of the test chamber (100 ml) was controlled by a thermostated circulator to within 0.2 C. The advancing contact angles and surface tension were measured at an immersion speed of 6 mm/min with a 15 mm immersion depth. The surface tension-immersion depth hysteresis curve in water was automatically recorded by computer. Each measurement took five consecutive strokes and the data of last three strokes were employed to calculate the contact angle and surface tension using the standard calculation procedure (DCA4A, Cahn Instrument Inc.) The mean data with standard deviation less tan 5% are shown in the discussion and results below Ellipsometery Spectroscopic ellipsometry (Gaertner Ellipsometer) was used to determine the thickness of the oxide layer and immobilized organosilane layer on the surface of silicone wafer. All samples were dried in the vacuum oven at 30 C overnight before measurement. The measurements were carried out immediately after the samples were taken out of the oven. At least five points on the sample surface were measured and the thickness of oxide and organosilane layers was calculated by the standard procedure (Auto, Gaertner Ellipsometer). The refractive index of the monolayer and underlying oxide was taken as 1.46.32 The thickness of organosilane layer was calculated by the subtraction of the thickness of oxide layer from the total thickness.

Swelling of Composite Crosslinked PNIPAAm Gels

Figure 13:
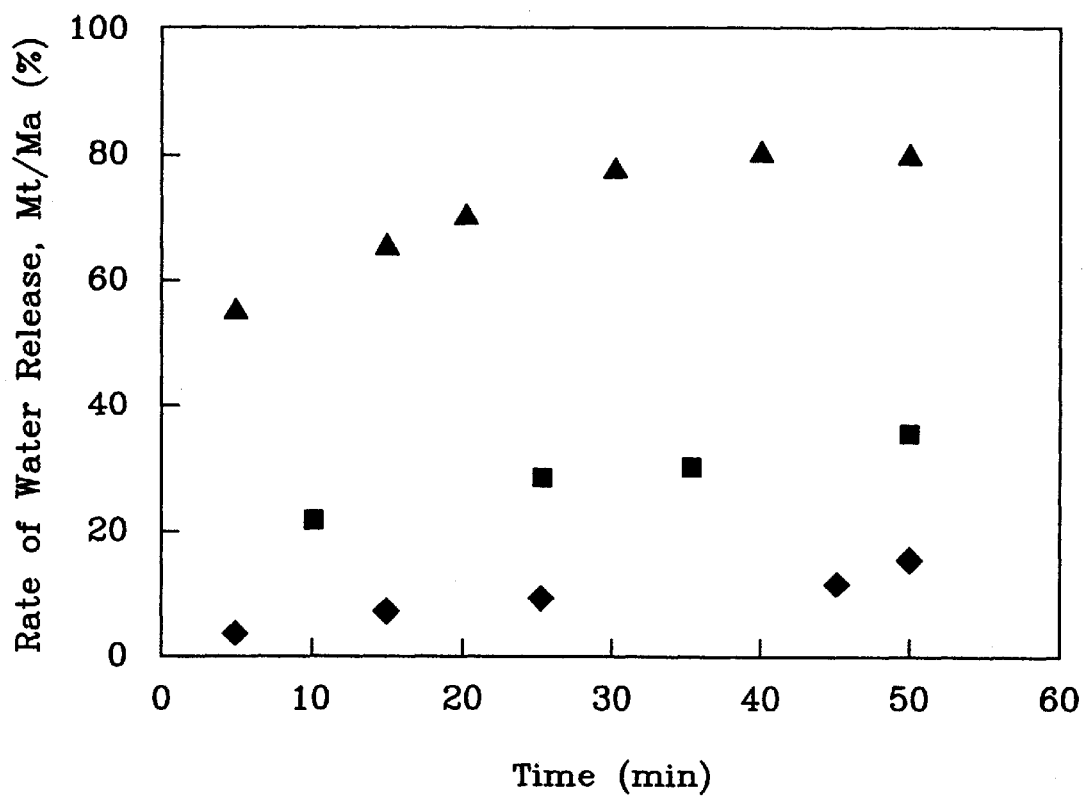
FIG. 13. is a graph showing the cumulative amount of released water and released time using gels about 2 mm thick and a glass plate as a substrate where the composition of PNIPAAm gel: NIPAAm/BisAAm is 45 (molar ratio).

The equilibrium swelling of the crosslinked PNIPAAm gels was investigated by immersing samples in water at a fixed temperature for 48 hours to ensure reaching equilibrium. FIG. 13 shows the water uptake rate. After the samples were taken out from water and carefully wiped with tissue paper to remove the adherent water from gel surface, the samples were weighed. The swelling ratio of samples, S, is expressed as: $S=(W_s-W_d)/W_d$, where $W_s$ and $W_d$ are the weight of the swollen and dried samples, respectively.

Rate of Water Release

The rate of water release by the composite crosslinked PNIPAAm gels from the equilibrium swollen sate to the equilibrium shrinking condition was measured by immersing the samples in water at 15 C for 48 hours, then, transferring them to water at higher temperature. The samples were removed from the water at a specific time and weighed after being wiped with tissue paper to remove excess water on the gel surface. The rate of water release is then expressed as the ratio of Mt to Mm, where Mt and Mm are the total amount of diffusion water at time t and after infinite time.

Results and Discussion

Figure 9:
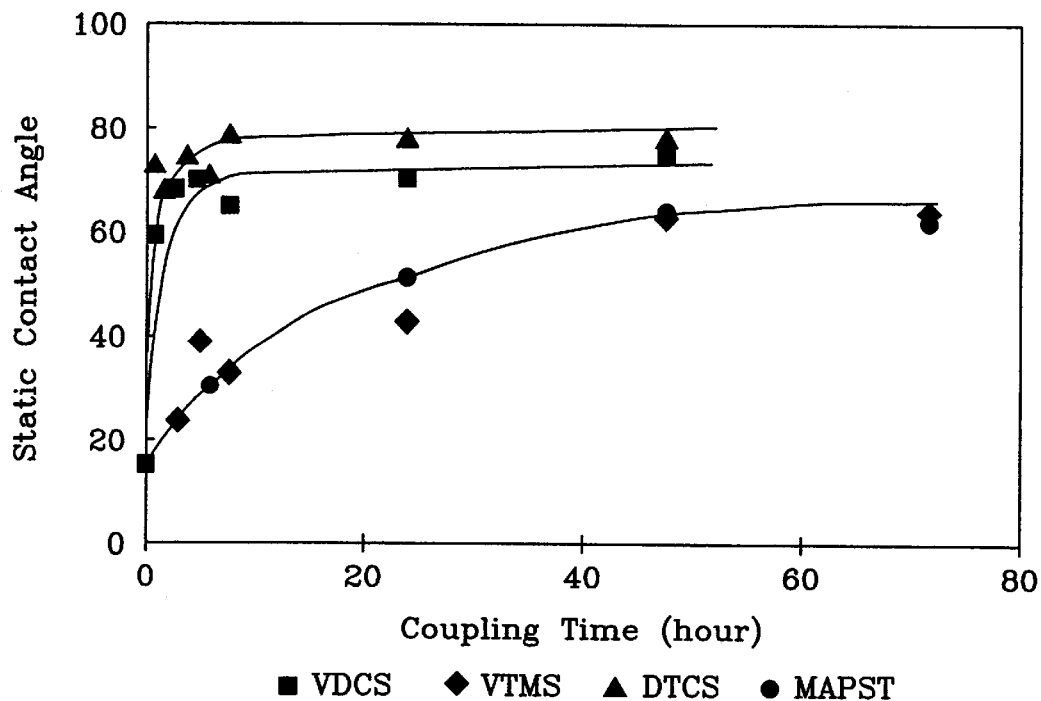
FIG. 9. is a graph showing the relationship between the coupling time and static contact angle of glass plate where the concentration of organosilane is 5% (v/v) in anhydrous toluene at a coupling temperature of 22 C using a glass plate as a substrate.

Organosilane is a useful chemical for the modification of surface of ceramic material. See E. P. Plueddemann, Silane Coupling Agents, Plenum Press, New York, 1982. Two kinds of organosilanes, alkoxysilane and chlorosilane are widely employed for this purpose. In this study, four organosilanes were used as coupling agents to introduce functional groups on the surface of substrates. Their basic properties are listed below in table 1:

with the coupling time. The glass plate without the modification of organosilane has the lower contact angle (~18 degrees) compared with the glass plates modified by organosilanes. This is because that the hydroxyl groups cover the original glass plate surface and the hydroxyl groups form hydrogen bonds with water molecules, i.e., the surface exhibits the typically hydrophilic characteristics. The static contact angle of all glass plates increases after the modification by organosilanes because of the hydrophobic characteristics of organosilane. The highly active of chloride atoms in VDCS and DTCS reacts with the hydrogen on the hydroxyl groups of the glass plates to form HCl, resulting in attachment of the activated organosilane bringing to the glass plates. The contact angle of the resulting glass plates rapidly increases and arrives the equilibrium value as shown in FIG. 9 after 10 hours. While MAPTS and VTMS were used as the coupling agent, the contact angle increases gradually with the coupling time and arrives the equilibrium value only after 50 hours due to the slowly reaction process of MAPST and VTMS with the hydroxyl group of glass plate. Normally, this kind of reaction includes four steps. See B. Arkels, Chemtech., 7, 766 (1977). At the beginning, the hydrolysis of the group $Si(OCH_3)_3$ occurs and the condensation to oligomer follows. The oligomers form the hydrogen bond with the hydroxyl groups of the substrate. Finally, a covalent linkage is formed with the substrate by the concomitant loss of water during the drying or curing process.

Figure 10:
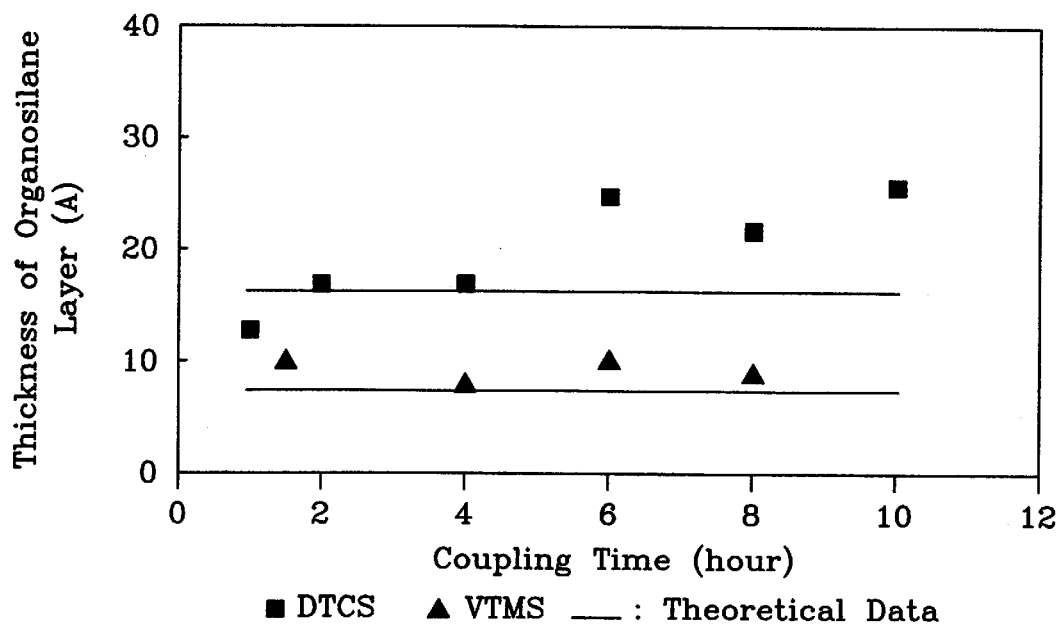
FIG. 10. is a graph showing the effect of the coupling time on the thickness of organosilane layer where the concentration of organosilane is 5% (v/v) in anhydrous toluene at a coupling temperature of 22 C using a silicone wafer as a substrate.

FIG. 10 shows that the thickness of organosilane layer generated on the surface of silicone wafer with the change of coupling time. The theoretical thicknesses of a monolayer of organosilane molecule, calculated by the length of chemical bond (See D. R. Lide Ed., CRC Handbook of Chemistry and Physics, Chapter 9, CRC Press, New York, 1996.) are also shown in FIG. 10 for comparison. When VTMS is used as the coupling agent, the experimental data match with the theoretical data very well, indicating it is possible to generate the a monolayer of VTMS molecule on the substrate. The deviation of the experimental data from theoretical data was found when DTCS used as the coupling agent at the longer coupling time. This might be attributed to the intermix of multi molecular layers by the loose network structure. The probability of the intermix by multi molecular

TABLE 1

Basic properties of organosilanes used to modify the ceramic substrates.

| Organosilane | Abbreviation | Structure | M.W | bp (C) |
|---|---|---|---|---|
| Vinyldimethylchlorosilane | VDCS | $H_2C=HCClSi(CH_3)_2$ | 120.65 | 82 |
| vinyltrimethoxylsilane | VTMS | $H_2C=CHSi(OCH_3)_3$ | 148.23 | 123 |
| decyltrichlorosilane | DTCS | $CH_3(CH_2)_9Si(Cl)_3$ | 275.72 | 133 |
| methylacryloxypropyl-trimethoxysilane | MAPTS | $H_2C=C(CH_3)COO(CH_2)_3Si(OCH_3)_3$ | 248.35 | 78 |

Among them, VDCS, VTMS and MAPTS have vinyl groups which can be further employed to react with NIPAAm after coupling on the surface of substrates. Compared with other organosilanes, DTCS, without a vinyl group but with a longer carbon-carbon chain, is used to study the thickness of coupling layer. FIG. 9 shows the change of static contact angle of the glass plate modified by different organosilanes chains increases for the organosilane with long chain at longer coupling time.

Preparation of Composite Crosslinked PNIPAAm Gels

Three composite crosslinked PNIPAAm gels were prepared and the polymerization recipes are listed below in table 2.

TABLE 2

Compositions of polymerization solutions used to prepare the composite crosslinked PNIPAAm gels.

| NIPAAm/BisAAm (molar ratio) | NIPAAm (ml) | BisAAm (ml) | K2S2O8 (ml) | TMEDA (ml) | Water (ml) | T0/C 1 | T0/C 2 |
|---|---|---|---|---|---|---|---|
| 10 | 1.0 | 0.136 | 0.01 | 0.2 | 20 | 31 | 33 |
| 45 | 1.0 | 0.030 | 0.01 | 0.2 | 20 | 33 | 35 |
| 85 | 1.0 | 0.017 | 0.01 | 0.2 | 20 | — | — |

Polymerization temperature: 6 C
T0/C 1 Obtained from the measurement of equilibrium swelling ratio.
T0/C 1 Obtained from the measurement of dynamic contact angle.

The glass plate as the substrate of crosslinked PNIPAAm gel improves the mechanical properties of PNIPAAm gel, especially with lower crosslinking density. In this way, the requirement on crosslinking density of PNIPAAm gels can be greatly reduced for property measurements and for application. The composite gel can be picked up by tweezers from the solution without much damage. However, when the molar ratio of NIPAAm to BisAAm is 85, the mechanical property of gel is so poor that it is impossible to perform any further measurements although the gel can be generated on the surface of glass plate.

Swelling of Composite Crosslinked PNIPAAm Gels

Figure 11:
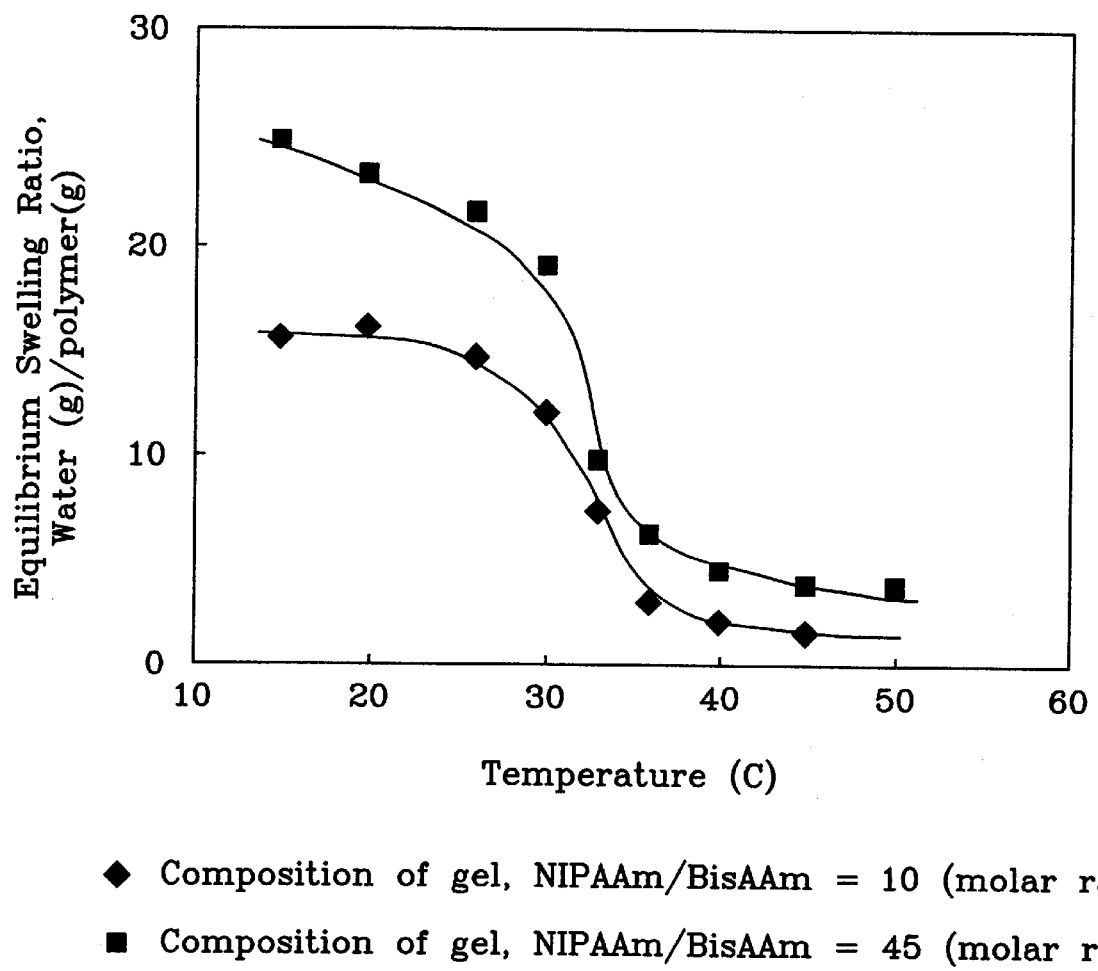
FIG. 11. is a graph showing the equilibrium swelling ratios of the composite crosslinked PNIPAAm gels in pure water with a gel thickness of about 2 mm and a glass plate used as a substrate.

The swelling of composite crosslinked PNIPAAm gels as a function of temperature is shown in FIG. 11. It is clear that the composite gels can deliver about 14 and 20 g of water when the temperature changes from 20 to 40 C, depending on the crosslinking density of gels. The larger amount of water is delivered by gel with a crosslinking network. In a PNIPAAm solution, the phase transition behavior can be clearly observed at the phase transition temperature which indicates the remarkable change of physical properties of polymer solution. The transition is still quite sharp in the swelling process of composite crosslinked PNIPAAm gels when the temperature changes as shown in FIG. 11. The phase transition temperature of polymer gels, T0, lies in the vicinity of 31 C and 33 C, respectively as shown in Table 2. All composite gels exhibit a negative thermosensitive response, swelling below T0 and deswelling above T0. It is clear that the amount of crosslinked agent, correspondence to the crosslinking density of the composite gels can control the swelling ratio. The increase of crosslinking density in polymer gel moves the phase transition temperature to low temperature. This is because the crosslinking agent, BisAAm is more hydrophobic compared to monomer, NIPAAm, and, consequently, the increase of crosslinking agent increases the hydrophobic properties of gel. The increased crosslinking density of polymer gel also limits the absorption of water by the gel. Therefore, the phase transition temperature decreases as the result of the increase of hydrophobic properties of polymer gel. See H. Feil, H. Y. Bae and S. W. Kim, Macromolecules, 26, 2496 (1993).

Rate of Water Release

Figure 12:
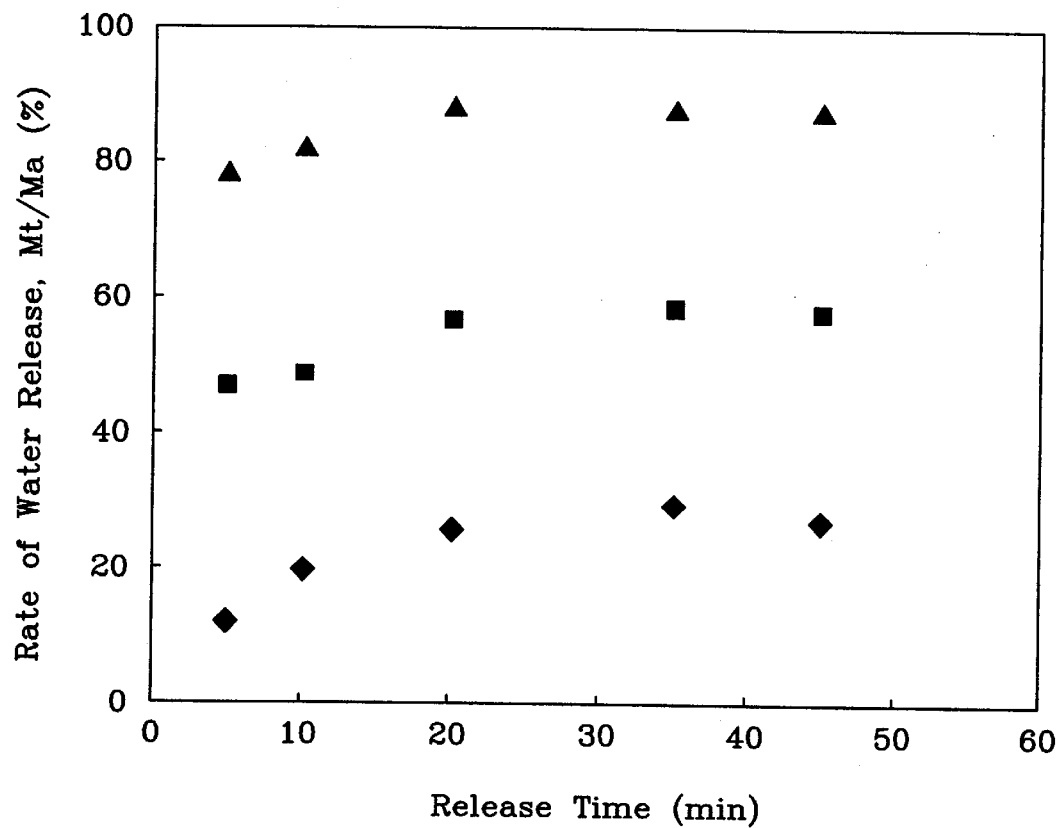
FIG. 12. is a graph showing the cumulative amount of release water and released time using gels about 2 mm thick with a glass plate used as substrate where the composition of PNIPAAm gel: NIPAAm/BisAAm is 10 (molar ratio).

The rate of water release by composite gels was measured by equilibrated gels at different temperatures. FIGS. 12 and 13 show that the rate of water release from composite crosslinked PNIPAAm gels is a function of released time. The rate of water release increases rapidly in the course of gel shrinkage when the temperature approaches T0. The gel was transparent when temperature was below T0 and become opaque with some small bubbles when temperature was above T0. This may be because the outer surface of gel is the first region affected by temperature and the collapsed skin layer is denser than the bulk matrix. The heterogeneous structure makes the gel appear opaque. This denser layer limits the diffusion of water from the gel during the initial period of shrinkage, which results in the accumulation of interior pressure within gel and the formation of small bubbles on the surface. See Y. Kaneko, R. Yoshida, K. Sakai, Y. Sakurai and T. Okano,. J. Membrane Sci., 101, 13 (1995). By further increasing the interior pressure, water finally overcomes the resistance of denser layer and can release from the bubbles. The shrinkage force increases with increasing temperature, therefore, the rate of water release increases with temperature. By comparing the water release rate of two kinds of gels shown in FIGS. 12 and 13, it can be seen that the rate of water release increases with increasing crosslinking density of gels. The increase of crosslinking density results in the gel with denser layer. At same temperature, the interior pressure of gel with higher crosslinking density is higher than that with lower crosslinking density. Therefore, the interior water is more rapidly expelled by higher interior accumulation pressure in the higher crosslinking gels.

Hydrophilic/hydrophobic Surface Properties vs. Temperature

Figure 14:
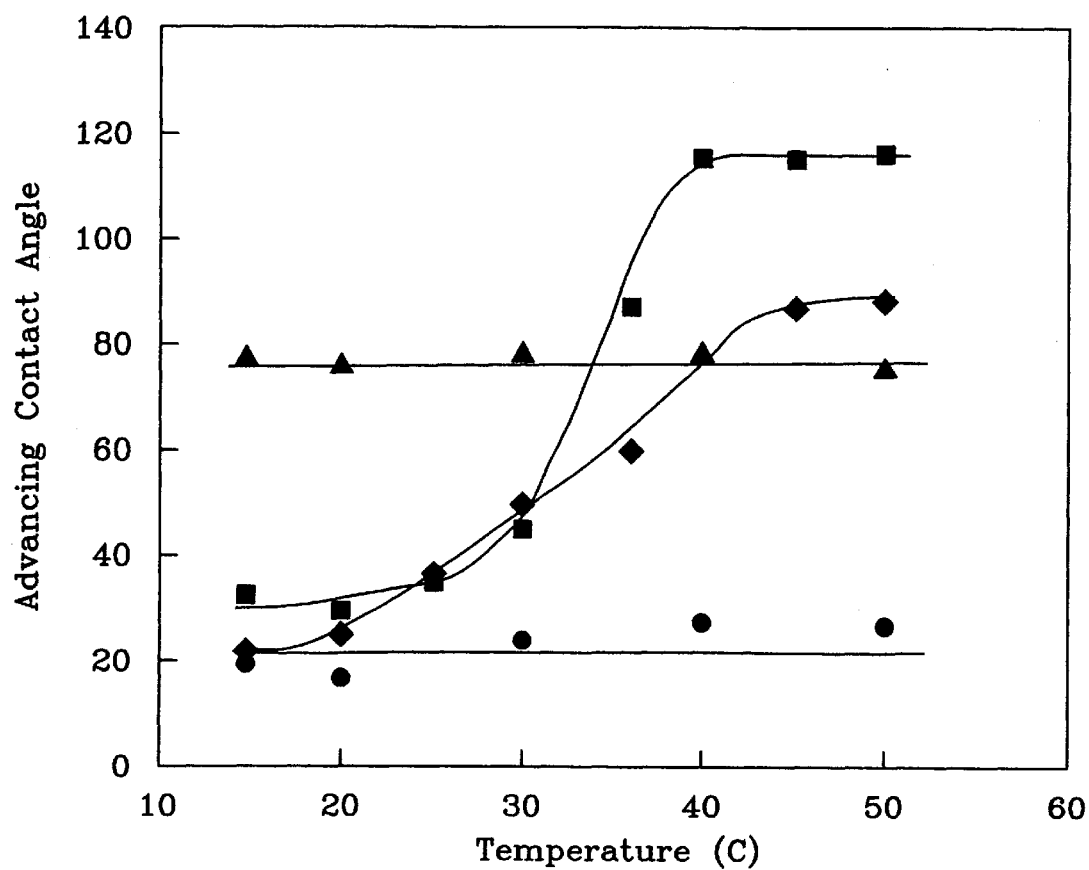
FIG. 14. is a graph showing the effect of temperature on dynamic contact angle with a gel about 2 mm thick and a glass plate used as substrate.

Temperature dependent surface properties were evaluated by the dynamic contact angle at the temperature range from 10 C to 50 C. FIG. 14 shows the effect of temperature on the advancing contact angle of glass plates with OH and SiCH=CH2 groups, which were introduced by treatment of preclean solution and VTMS. The surface behavior of the crosslinked PNIPAAm gel are also given in FIG. 14 as a comparison. The surfaces with OH and SiCH=CH2 groups exhibited no changes in contact angles. This is because neither OH or SiCH=CH2 groups has characteristics of temperature response. The lower contact angle of glass plate with OH groups and higher contact angle of glass plate with SiCH=CH2 are attributed to the hydrophilic and hydrophobic properties of OH and SiCH=CH2 groups, respectively.

Figure 15:
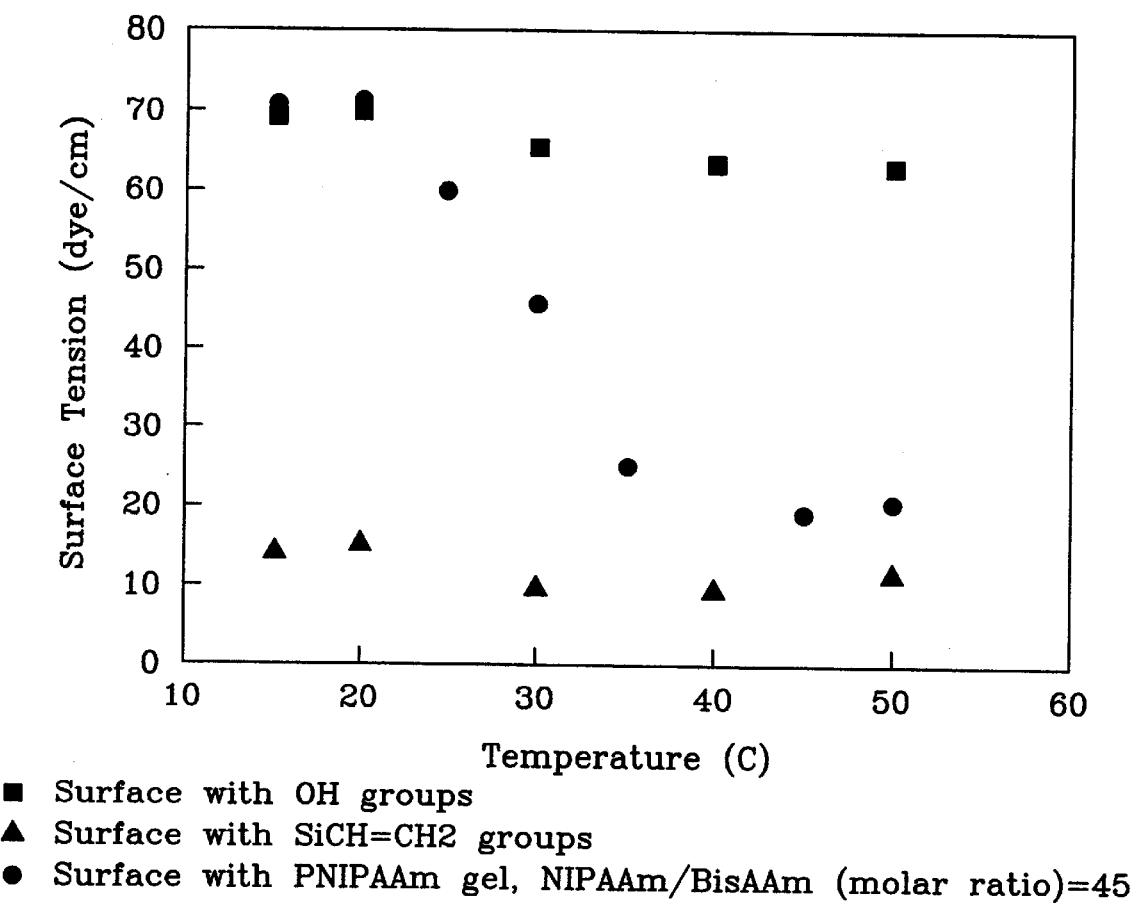
FIG. 15. is a graph showing the effect of temperature on surface tension with a gel about 2 mm thick and a glass plate used as substrate.

FIG. 15 shows the effect of temperature on the surface tension of glass plates without and with PNIPAAm gel layer. The surface tension of glass plates with OH and SiCH=CH2 groups is unchanged across the whole range of temperature measurement. The glass plate with OH groups exhibits the lower surface tension (~12 dyn/cm), compared to the high surface tension of the glass plate with SiCH=CH2 groups (~65 dyn/cm). This is because the water molecules can wet the surface of OH groups very well and the energy can move to the glass plate as water increases. The repellency between hydrophobic vinyl groups and hydrophilic water molecules results in the decrease of the energy needed to move to the glass plate. Consequently, the surface tension increases or decreases as the increase or decrease of the moving energy. See P. W. Atkins, Physical Chemistry, Part 28, W. H. Freeman and Company, New York, 1996. The glass plate grafted by crosslinked PNIPAAm gel layer shows the reverse change of surface tension. The surface tension increases at low temperature, but decreases at the high temperature. This change is the result of reverse characteristics of hydrophilic/hydrophobic surface.

Conclusion

Both alkoxysilane and chlorosilane can be employed as the coupling agent to introduce the vinyl groups on the surface of ceramic substrates with OH groups. Compared with the surface modified by slowly condensation reaction between alkoxysilane and hydroxyl groups of substrate surface, the contact angle of surface rapidly arrives its equilibrium value due to the faster reaction of chlorosilane with hydroxyl groups. When the temperature is above LCST of PNIPAAm, the denser layer is generated on the outer surface of gel, which results in the accumulation of hydrostatic interior pressure within the gel. The interior pressure increases with both increasing hydrophobic properties and with increasing crosslinking density of gel. Consequently, the rate of water release increases. The surface of composite crosslinked PNIPAAm gels not only demonstrates the characteristics of water release but also the temperature response, that is, the completely hydrophilic properties below 20 C and the hydrophobic properties above 40 C. As the temperature increases, the contact angle increases and the extents of increase depend both the crosslinking density and the hydrophobic properties of polymer gel. As a result of the faster release of water from the gel with higher crosslinking density, the gel surface shows more hydrophobic characteristics.

Microtechnology Applications

The fundamental difference between a macroscale device and a micro or nanoscale device is the relative ratio of fluid volume moved to the surface area of the fluid conduit, pump impeller area, or valve aperture. Surface forces between the fluid and the wall of a pipe are negligible in conventional pipe above about a 3-mm diameter. Below this, considerable work must be expended to overcome the attraction between fluid and device surfaces.

Rather than trying to find ways to overcome these surface forces, FSMs offer a way to use them beneficially in nanoscale technology. Fundamental to these uses is the development of materials having reversible wetting characteristics. Thus the central scientific issue in the development of the following preferred embodiments, are the strategies of exploiting highly functional surfaces of FSMs. Three preferred uses of these strategies are: anit-fouling in microchannels, as a flow control mechanism in a microseparator through forced convection, and as a micro-pump for manipulating water or other liquid droplets.

These approaches demonstrate the micro and nanoscale fluid handling capabilities of the present invention, particularly the methods of influencing the fluid-transport behavior, including fouling, pumping, and valving. The use of this capability can readily be employed in a wide variety of multi-step, intelligent (or smart) nanoscale chemical reactors and heat exchangers. Thus, the preferred embodiments herein described may be considered to include, but not be limited to, thermal, electrical, optical, magnetic, or electrochemical means for actuating the pumps and valves.

The three model systems of the preferred embodiments—antifouling surfaces in microchannels, forced convection within a microchannel separator, and a demonstration of a micro-pump for fluids through moving a drop of water—are discussed in detail below:

Antifouling Surface

One of the most important components in microtechnology, microchannels, is susceptible to fouling, i.e., the attachment of organic or inorganic materials on the microchannel surfaces. As a result, the efficiency and the life cycle of microenergy systems, microreactors, and microseparation systems may be reduced. The fundamental mechanisms of microchannel fouling are poorly understood. The most widely used methods for reducing fouling in membranes and marine transportation systems, e.g., slow release of antifouling agents, such as toxic chemicals and biocides embedded in coating materials, are not suitable for microtechnology applications.

Figure 16:
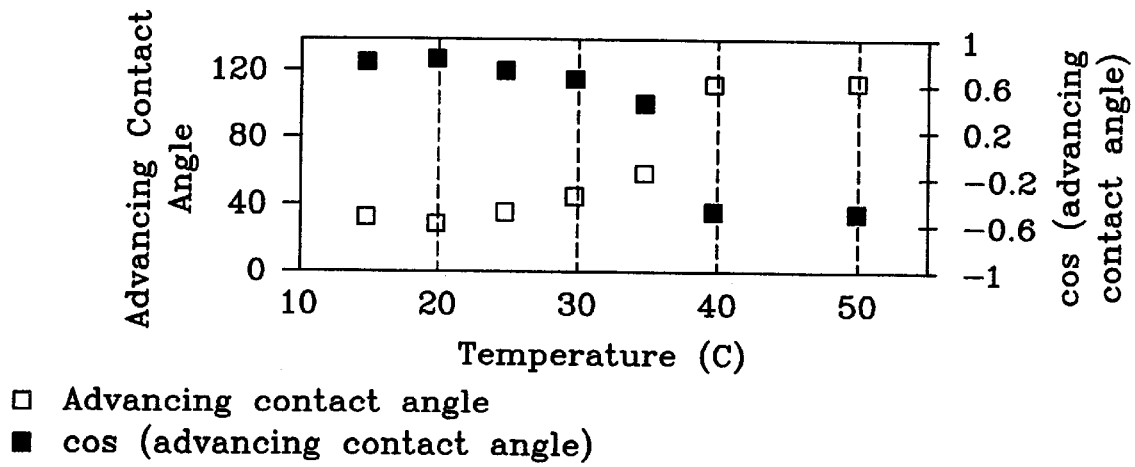
FIG. 16. is a graph showing the change in the dynamic contact angle of PNIPAM with a change in temperature.
Figure 18:
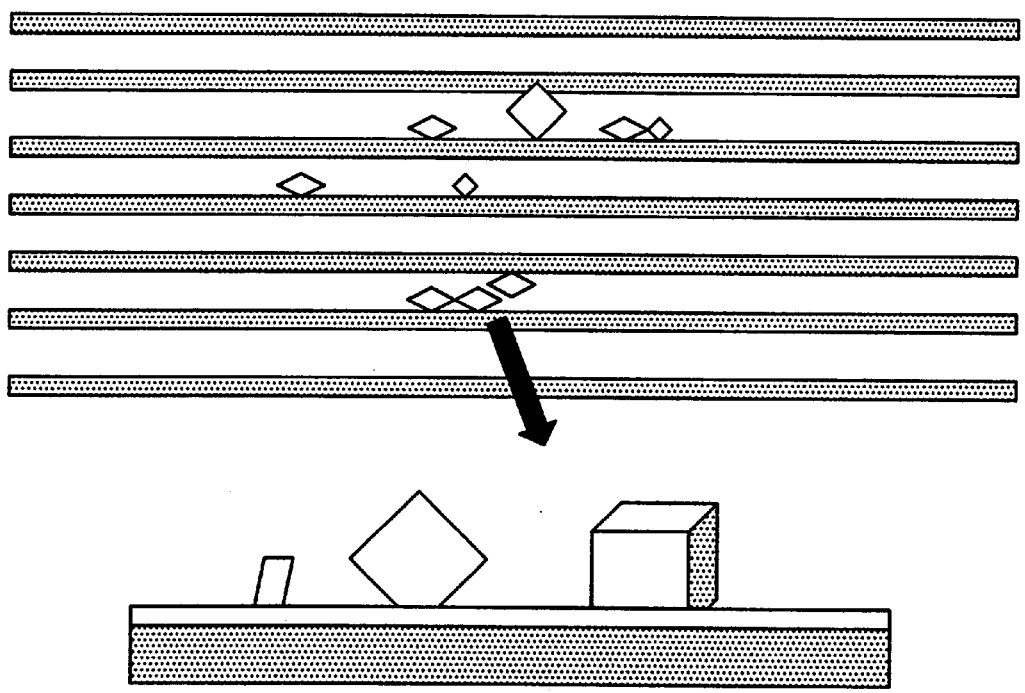
FIG. 18. is an illustration of an anti-fouling surface used in mircochannels.

As described infra, the structure of FSMs change over a very narrow temperature range. At 25° C., the polymer chains interact strongly with water and are well wetted. At 40° C., the strong interaction with water is lost, the polymer chains collapse, and the surface becomes hydrophobic. The hydrophilic/hydrophobic character as measured by contact angle ranged from 20° in the high-temperature state to 100° in the hydrophilic state as shown in FIG. 16. When this surface is coated in the microchannel as shown in FIG. 18, a novel antifouling surface is developed. When this coated microchannel is in contact with an aqueous system at room temperature, minerals may begin to deposit on the surface because of the hydrophilic property at room temperature. If the surface is warmed up from room temperature to about 40° C., the surface becomes completely hydrophobic. The hydrophilic deposit on the surface will be expelled away from the surface because hydrophobic surfaces are not compatible with hydrophilic minerals. A good antifouling surface can be potentially maintained by changing the surface temperature from time to time during operation.

Forced Convection within a Microchannel Separator

Figure 17:
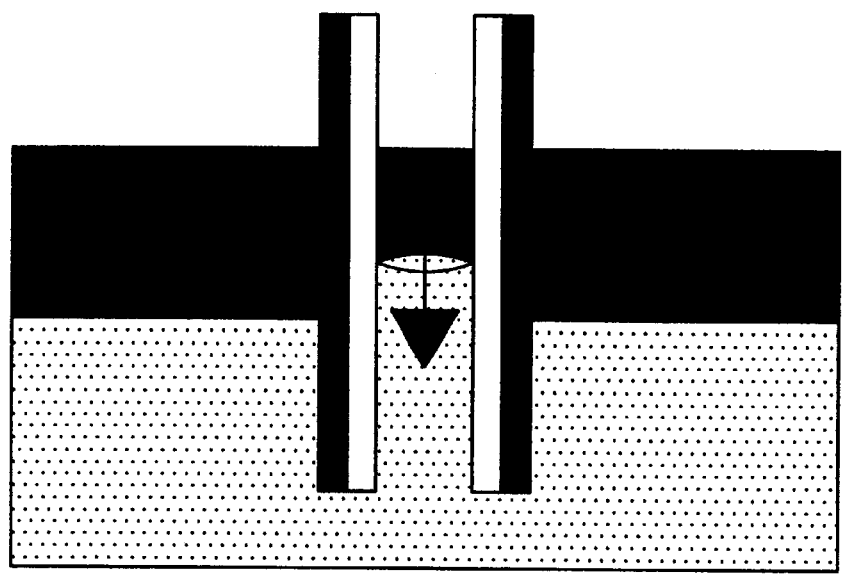
FIG. 17. is a graphical representation of forced convection in a model capillary tube microseparator.
Figure 19:
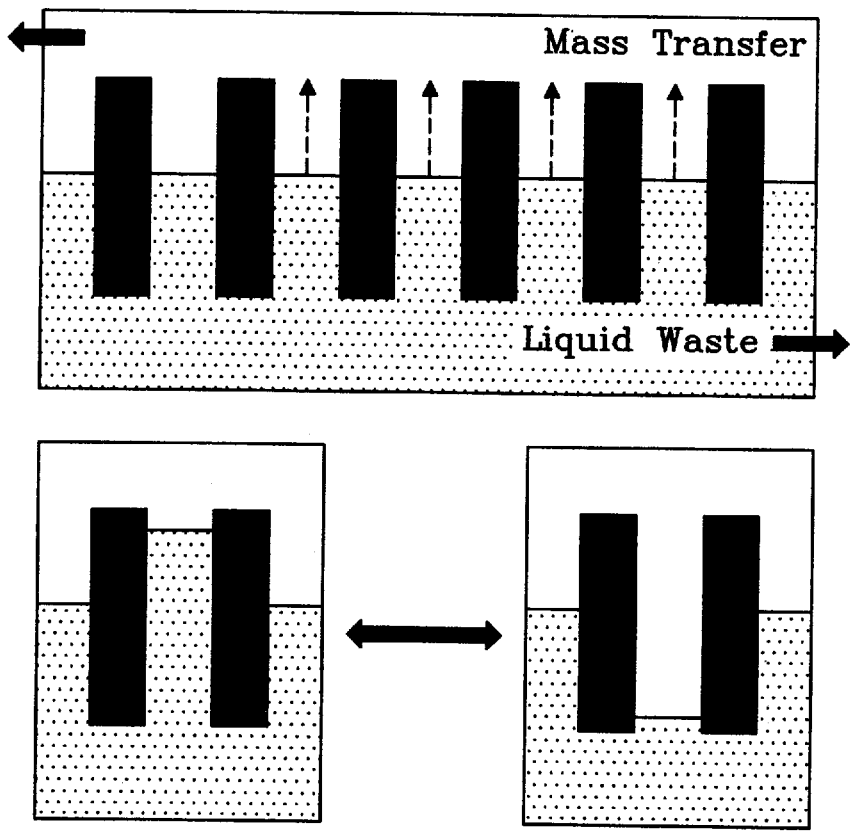
FIG. 19. is an illustration of a microserparator.

A microchannel separator is shown in FIG. 17 and FIG. 19. An organic solvent is used to extract the waste components from an aqueous system. The efficiency of the microseparator is greatly influenced by the mass transfer at the interface of organic solvent and aqueous liquid wastes. A forced oscillation between this interface dramatically improves its performance. A model system to mimic this process involves a capillary tube immersed in two immiscible solvents (e.g., an aqueous solvent on top of a heavier organic solvent) as shown in FIG. 19. The goal is to move the liquid surface in the capillary tube up and down across the interface of the two solvents. We first coat the interior of the tube with electroactive functional molecules. Without an electrical field, the coating in the capillary tube is hydrophilic, and the meniscus is at the bottom of the capillary tube. The meniscus level is expected to move to the top of the capillary tube when the coating becomes hydrophobic under an electrical field. This process can be regulated with an electrical field (or thermal field).

Manipulating Water Drops

Figure 20:
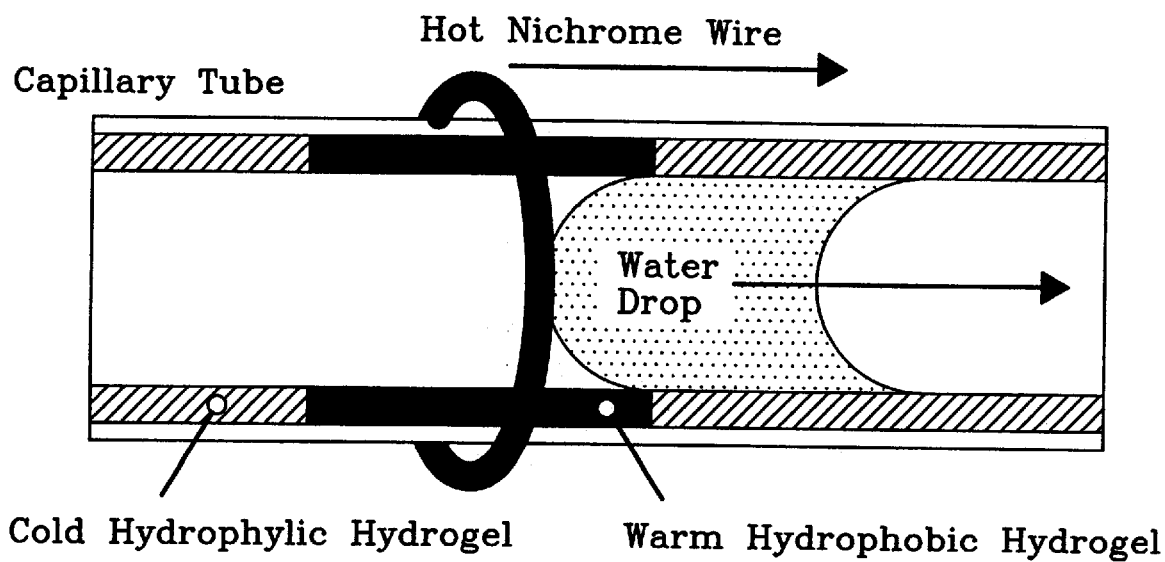
FIG. 20. is an illustration of a micropump.

Important work can be performed in micrompumps by actively and reversibly control the wettability of a surface. A drop of fluid placed thereon would then alternately spread and bead on the surface. Spacial control of the wettability allows the drop to be pulled on one edge by a hydrophilic surface and pushed on the other by a hydrophobic surface. A thermal gradient along the surface, e.g., in a capillary or microchannel, is used to achieve the contact angle gradient necessary to move the drop. By moving the thermal gradient, the drop can be transported relatively long distances. This concept as applied to a capillary tube is shown in FIG. 20.

Polymer coated capillaries can be used as the basis for a number of fluidic control components. It is easy to envision the above drop transport concept as a pump driven by surface energy. Rather than a single thermal gradient, a sinusoidal or oscillating series of gradients can be used to push multiple drops in a continuous manner. Alternatively, similar concepts can be used as two- and three-way valves to control the flow.

Summary

On the micro and nano scales, surface capillary forces can dominate system energetics. Our goal is to harness these energies in a useful manner with particular emphasis on fluidics control in uses such as nanoscale chemical reactors and separators. To achieve this, it is necessary to reversibly, deliberately, and spatially control the wettability of the surface. Photo or electrical methods for control are of particular interest. One can envision using semiconductor lasers or MOSFET junctions to activate valves or pumps. In this way, mechanical devices can become integrated with electronic devices, physical or chemical sensors, enzymatic reactors, and heat exchangers to create truly versatile, intelligent, nanoscale chemical factories.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A composition of matter comprising a glass surface bonded to a silane coupling agent having a thiocarbamate group, said thiocarbamate group bonded to a layer of poly (N-isopropylacrylamide) and a cross linking agent.

2. The composition of matter of claim 1 wherein said glass is selected from the group consisting of silicon dioxide, boric oxide, aluminum oxide, and phosphorus pentoxide.

3. The composition of matter of claim 1 wherein said crosslinking agent is selected as an organic molecule having an acrylamide group and at least two double bonds in said organic molecule's structure.

4. The composition of matter of claim 3 wherein said crosslinking agent is N,N'-methylenebisacrylamide.

5. The composition of matter of claim 1 wherein said silane coupling agent is (N,N'-diethylamine) dithiocarbamoylpropyl-(trimethoxy) silane.

6. A microchannel filter comprising a glass microchannel surface bonded to a silane coupling agent having a thiocarbamate group, said thiocarbamate group bonded to a layer of poly(N-isopropylacrylamide) and a cross linking agent.

7. The microchannel filter of claim 6 wherein said glass is selected from the group consisting of silicon dioxide, boric oxide, aluminum oxide, and phosphorus pentoxide.

8. The microchannel filter of claim 6 wherein said crosslinking agent is selected as an organic molecule having an acrylamide group and at least two double bonds in said organic molecule's structure.

9. The microchannel filter of claim 8 wherein said crosslinking agent is N,N'-methylenebisacrylamide.

10. The microchannel filter of claim 6 wherein said silane coupling agent is (NN'-diethylamine) dithiocarbamoylpropyl-(trimethoxy) silane.

11. A capillary fluid pump comprising a glass capillary having an interior and an exterior surface wherein said interior surface is bonded to a silane coupling agent having a thiocarbamate group, said thiocarbamate group bonded to a thin layer of poly(N-isopropylacrylamide).

12. The capillary fluid pump of claim 11 wherein said glass is selected from the group consisting of silicon dioxide, boric oxide, aluminum oxide, and phosphorus pentoxide.

13. The capillary fluid pump of claim 11 wherein said crosslinking agent is selected as an organic molecule having an acrylamide group and at least two double bonds in said organic molecule's structure.

14. The capillary fluid pump of claim 13 wherein said crosslinking agent is N,N'-methylenebisacrylamide.

15. The capillary fluid pump of claim 11 wherein said silane coupling agent is (N,N'-diethylamine) dithiocarbamoylpropyl-(trimethoxy) silane.

* * * * *